(12) United States Patent
Kim et al.

(10) Patent No.: US 9,641,298 B2
(45) Date of Patent: May 2, 2017

(54) METHOD AND DEVICE FOR RECEIVING DOWNLINK SIGNAL IN WIRELESS COMMUNICATION SYSTEM

(71) Applicant: LG ELECTRONICS INC., Seoul (KR)

(72) Inventors: Eunsun Kim, Anyang-si (KR); Hanbyul Seo, Anyang-si (KR); Byounghoon Kim, Anyang-si (KR); Kijun Kim, Anyang-si (KR); Jonghyun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/411,781

(22) PCT Filed: Jul. 3, 2013

(86) PCT No.: PCT/KR2013/005895
§ 371 (c)(1),
(2) Date: Dec. 29, 2014

(87) PCT Pub. No.: WO2014/007539
PCT Pub. Date: Jan. 9, 2014

(65) Prior Publication Data
US 2015/0146644 A1 May 28, 2015

Related U.S. Application Data

(60) Provisional application No. 61/667,937, filed on Jul. 3, 2012, provisional application No. 61/669,134, filed
(Continued)

(51) Int. Cl.
*H04L 5/00* (2006.01)
*H04J 11/00* (2006.01)

(52) U.S. Cl.
CPC ........ *H04L 5/0048* (2013.01); *H04J 11/0053* (2013.01); *H04L 5/0023* (2013.01); *H04L 5/0035* (2013.01); *H04L 5/0094* (2013.01)

(58) Field of Classification Search
None
See application file for complete search history.

(56) References Cited

U.S. PATENT DOCUMENTS 8,934,326 B2    1/2015   Bhattad et al.
2011/0267937 A1   11/2011  Yoo et al.
(Continued)

FOREIGN PATENT DOCUMENTS

KR    10-2010-0117522 A    11/2010
KR    10-2011-0011508 A    2/2011
(Continued)

OTHER PUBLICATIONS

Ericsson et al., "Discussion on quasi co-located antennas," 3GPP TSG-RAN WG4 #63, May 21-25, 2012, pp. 1-7, R4-122702.
(Continued)

*Primary Examiner* — Kodzovi Acolatse
(74) *Attorney, Agent, or Firm* — Birch, Stewart, Kolasch & Birch, LLP

(57) ABSTRACT

A method for a terminal for receiving a downlink signal according to an embodiment of the present invention comprises a step of receiving a channel state information-reference signal (CSI-RS) on the basis of CSI-RS configuration information elements containing quasi co-location cell-specific reference signal (QCL CRS), wherein the terminal receives the CSI-RS by means of a QCL assumption on the basis of the QCL CRS information, and if the information contained in the QCL CRS information and the information known to the terminal corresponding to the information contained in the QCL CRS are not in agreement,
(Continued)

then the information known to the terminal is applied preferentially.

13 Claims, 22 Drawing Sheets

Related U.S. Application Data on Jul. 9, 2012, provisional application No. 61/679,057, filed on Aug. 2, 2012, provisional application No. 61/681,646, filed on Aug. 10, 2012, provisional application No. 61/735,518, filed on Dec. 10, 2012, provisional application No. 61/754,627, filed on Jan. 20, 2013.

(56) References Cited

U.S. PATENT DOCUMENTS

| | | |
|---|---|---|
| 2012/0046033 A1 | 2/2012 | Ko et al. |
| 2012/0087261 A1 | 4/2012 | Yoo et al. |
| 2012/0155362 A1 | 6/2012 | Montojo et al. |
| 2012/0182951 A1 | 7/2012 | Okubo et al. |
| 2013/0114496 A1 | 5/2013 | Mazzarese et al. |
| 2013/0182799 A1* | 7/2013 | Geirhofer ............ H04W 56/00 375/340 |
| 2013/0258964 A1* | 10/2013 | Nam .................... H04W 72/046 370/329 |
| 2013/0279437 A1* | 10/2013 | Ng ........................ H04W 48/16 370/329 |
| 2014/0092827 A1* | 4/2014 | Jongren ................ H04L 5/0053 370/329 |
| 2014/0119266 A1* | 5/2014 | Ng ........................ H04L 1/0061 370/312 |
| 2014/0128115 A1 | 5/2014 | Siomina et al. |
| 2014/0286184 A1 | 9/2014 | Kim et al. |
| 2015/0105077 A1 | 4/2015 | Yao et al. |

FOREIGN PATENT DOCUMENTS

| | | |
|---|---|---|
| WO | WO 2011/005537 A2 | 1/2011 |
| WO | WO 2011/021587 A1 | 2/2011 |
| WO | WO 2011/137314 A1 | 11/2011 |
| WO | WO 2011/163201 A1 | 12/2011 |

OTHER PUBLICATIONS

Ericsson, "Draft LS response on reference scenarios for antenna ports co-location," 3GPP TSG-RAN1 Meeting #69, May 21-25, 2012, 2 pages, R1-122540.

Ericsson, "LS response on antenna ports co-location," 3GPP TSG-RAN1 Meeting #68bis, Mar. 26-30, 2012, 2 pages, R1-121919.

\* cited by examiner

Sub-frame

FIG. 7
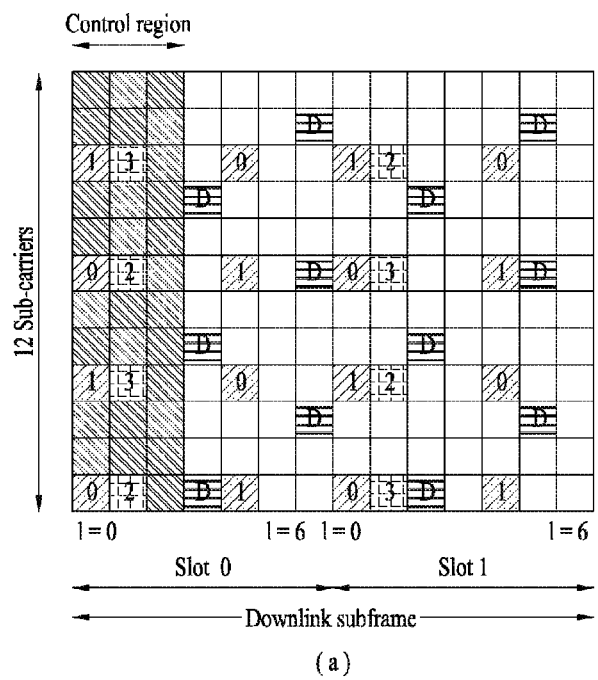
(a)
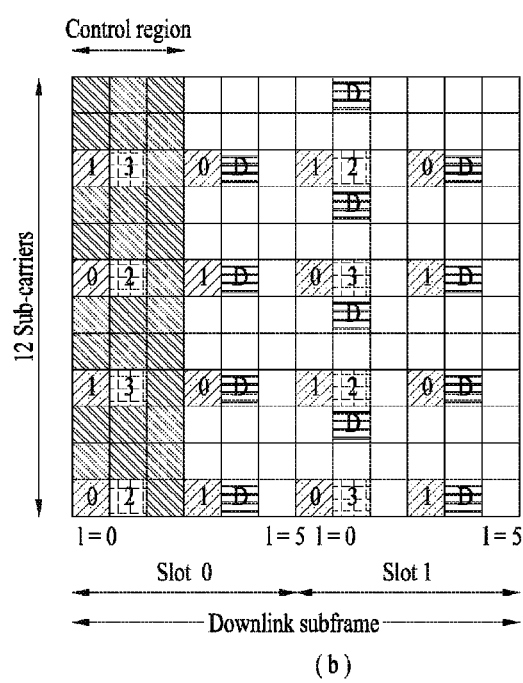
(b)

METHOD AND DEVICE FOR RECEIVING DOWNLINK SIGNAL IN WIRELESS COMMUNICATION SYSTEM

CROSS REFERENCE TO RELATED APPLICATIONS

This application is the National Phase of PCT International Application No. PCT/KR2013/005895, filed on Jul. 3, 2013, which claims priority under 35 U.S.C. 119(e) to U.S. Provisional Application Nos. 61/667,937 filed on Jul. 3, 2012, 61/669,134 filed on Jul. 9, 2012, 61/679,057 filed on Aug. 2, 2012, 61/681,646 filed on Aug. 10, 2012, 61/735,518 filed on Dec. 10, 2012 and 61/754,627 filed on Jan. 20, 2013, all of which are hereby expressly incorporated by reference into the present application.

TECHNICAL FIELD

The following description relates to a wireless communication system and, more particularly, to a method and apparatus for receiving a downlink signal through quasi co-location (QCL) assumption.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, and a multi-carrier frequency division multiple access (MC-FDMA) system.

DISCLOSURE

Technical Problem

The present invention discloses a method and apparatus related to operation of a user equipment when information signaled upon receiving a reference signal through QCL assumption is different from information known to the user equipment.

The technical objects that can be achieved through the present invention are not limited to what has been particularly described hereinabove and other technical objects not described herein will be more clearly understood by persons skilled in the art from the following detailed description.

Technical Solution

In accordance with a first technical aspect of the present invention, a method for receiving a downlink signal by a user equipment (UE) in a wireless communication system comprises receiving a channel state information-reference signal (CSI-RS) according to CSI-RS configuration information (CSI-RS-ConfigNZP information elements) including quasi co-location (QCL) cell-specific reference signal (CRS) information, wherein the UE receives the CSI-RS using QCL assumption based on the QCL CRS information (qcl-CRS-Info), and if information included in the QCL CRS information is not equal to information which corresponds to the information included in the QCL CRS information and is known to the UE, the information known to the UE is given priority and applied.

In accordance with a second technical aspect of the present invention, a user equipment (UE) in a wireless communication system comprises a reception module; and a processor, wherein the processor receives a channel state information-reference signal (CSI-RS) according to CSI-RS configuration information including quasi co-location (QCL) cell-specific reference signal (CRS) information, the UE receives the CSI-RS using QCL assumption based on the QCL CRS information, and, if information included in the QCL CRS information is not equal to information which corresponds to the information included in the QCL CRS information and is known to the UE, the information known to the UE is given priority and applied.

The first and second technical aspects of the present invention may include the following description.

The information included in the QCL CRS information may include cell identifier (ID) related information, information about the number of CRS ports, and multimedia broadcast single frequency network (MBSFN) subframe configuration information.

If the number of CRS ports is greater than the number of CRS ports known to the UE, QCL assumption may be applied only to the number of CRS ports known to the UE. In If the number of CRS ports is less than the number of CRS ports known to the UE, QCL assumption may be applied to CRS ports corresponding to the information about the number of CRS ports If a subframe in which the CSI-RS is received is an MBSFN subframe according to the MBSFN subframe configuration information and is a normal subframe according to information known to the UE, all CRSs of the subframe in which the CSI-RS is received may be used for QCL assumption.

If a subframe in which the CSI-RS is received is a normal subframe according to the MBSFN subframe configuration information and is an MBSFN subframe according to information known to the UE, CRSs up to the second OFDM symbol in the subframe in which the CSI-RS is received may be used for QCL assumption.

The cell ID related information may be equal to serving cell ID related information of the UE.

Information which corresponds to the information about the number of CRS ports and is known to the UE may be acquired when the UE performs initial access to a serving cell.

Information which corresponds to the MBSFN configuration information and is known to the UE may be acquired by the UE through a system information block.

A subframe in which the CSI-RS is received may not be included in a broadcast control channel (BCCH) modification period.

If the subframe in which the CSI-RS is received is included in the BCCH modification period, information included in the QCL CRS information may be given priority over information known to the UE and applied.

The CSI-RS configuration information may be transmitted to the UE through higher layer signaling.

Advantageous Effects

According to the present invention, even if signaled information is different from information known to a user equipment, a reference signal can be efficiently received through QCL assumption.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIG. 7 is a diagram for explaining a reference signal.

BEST MODE

Figure 1:
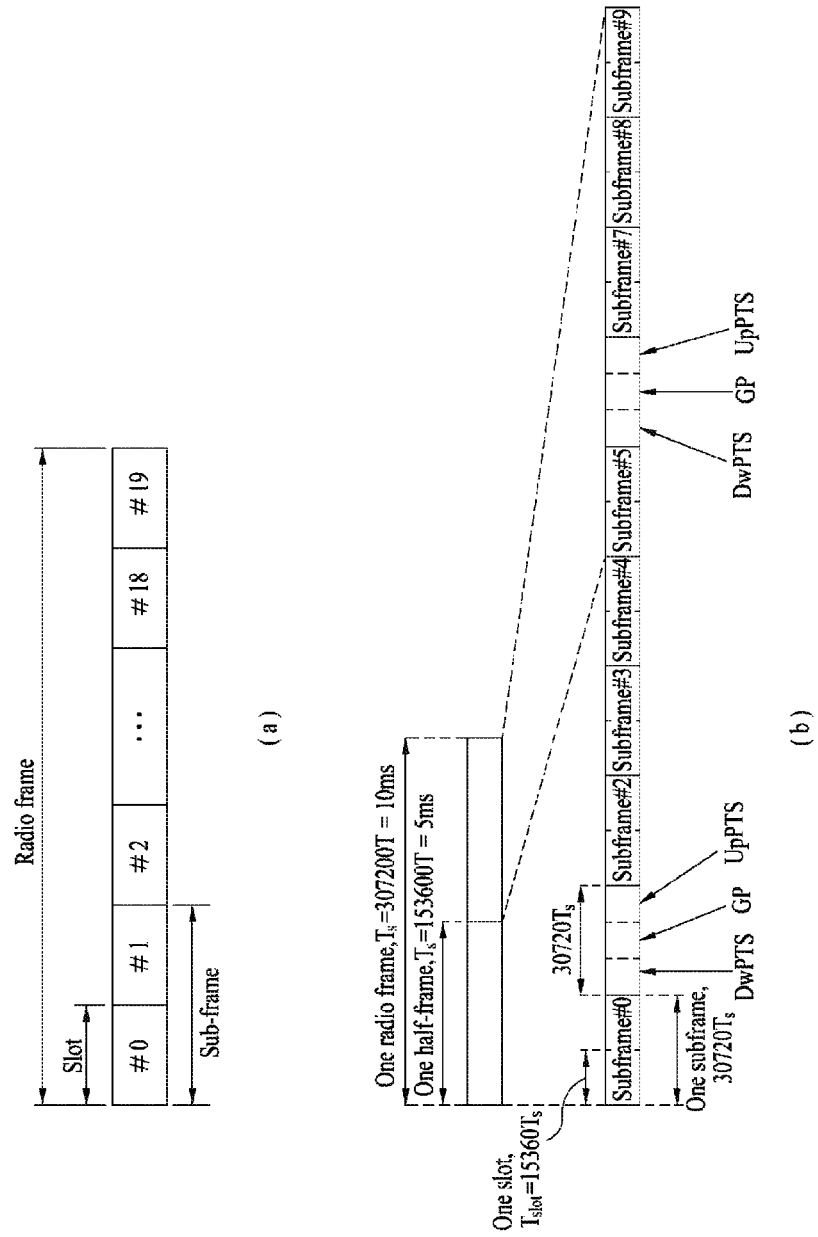
FIG. 1 is a diagram illustrating the structure of a radio frame.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

LTE/LTE-A Resource Structure/Channel

FIG. 1 exemplarily shows a radio frame structure.

The structure of a radio frame in 3GPP LTE system will be described with reference to FIG. 1. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram showing the structure of the type 1 radio frame. A radio frame includes 10 subframes, and one subframe includes two slots in the time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called an SC-FDMA symbol or a symbol duration. An RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
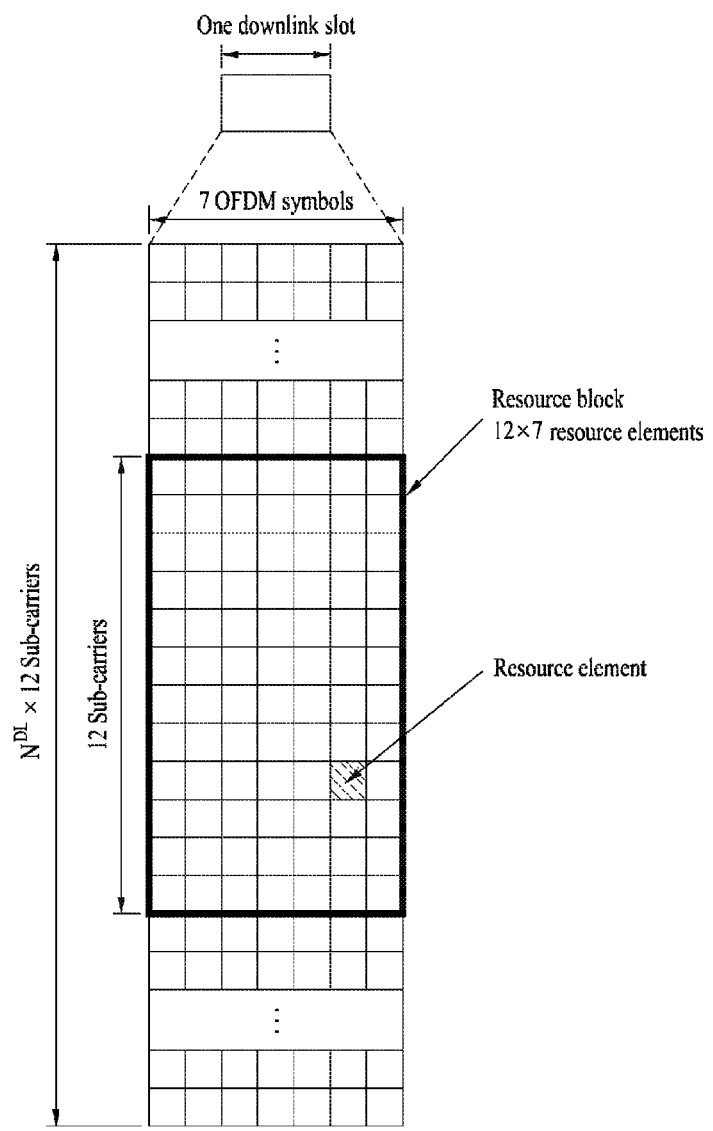
FIG. 2 is a diagram illustrating a resource grid in a downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
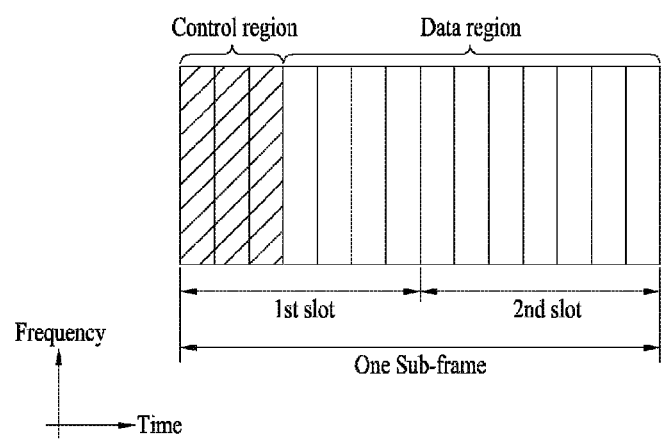
FIG. 3 is a diagram illustrating the structure of a downlink subframe.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted as an aggregate of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
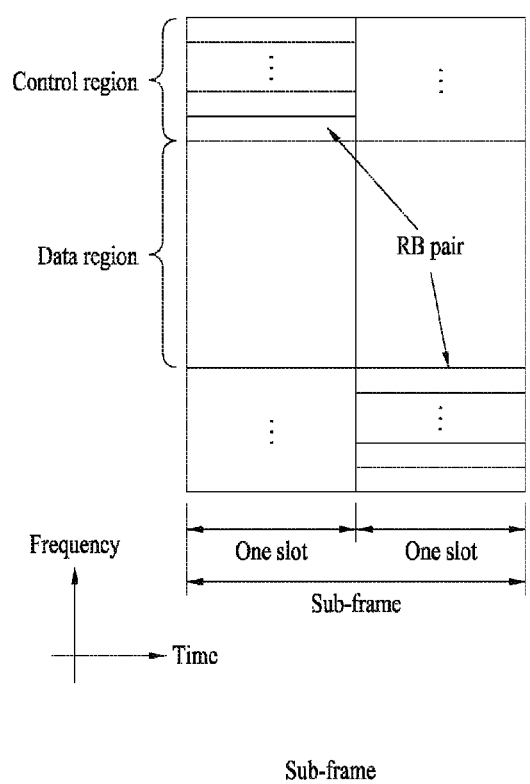
FIG. 4 is a diagram illustrating the structure of an uplink subframe.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

PDSCH Transmission Process

Figure 5:
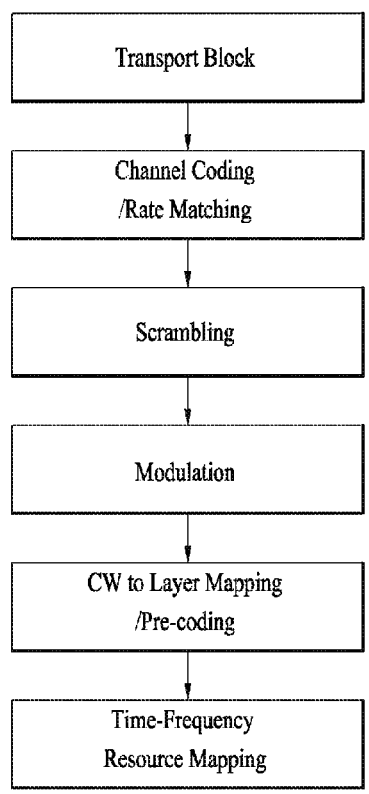
FIG. 5 is a diagram illustrating a PDSCH transmission procedure.

A PDSCH is a physical layer channel to which a DL-SCH, which is a transport channel for transmitting actual downlink user data, and a PCH, which is a transport channel for transmitting paging information, are mapped. A PDSCH transmission process can be explained by FIG. 5. Referring to FIG. 5, a DL-SCH or PCH transport block is channel-coded/rate-matched and then modulated after a scrambling procedure according to each cell identifier number. A sequence generated through the above procedures, i.e. a codeword, is mapped to a layer when necessary and is precoded. Thereafter, the codeword is mapped to a time-frequency resource and then is transmitted.

In order to encode and then transmit the DL-SCH and PCH transport block, the transport block is segmented into one or more code blocks and then is transmitted. For convenience of a decoding procedure and reduction of power consumption of a UE, a cyclic redundancy check (CRC) is attached to each code block. Otherwise, whether one transport block contains any errors may be determined, only after all code blocks are received and a CRC of the transport block is checked. However, if the CRC is attached to each code block, when it is determined that one received code block has an error, it may also be determined that the transport block has an error. Then, the next code blocks of the transport block need not perform decoding. Therefore, a transport block CRC (TB-CRC) is added first to the transport block mapped to the PDSCH and the transport block is segmented into one or more code blocks. Next, a code block CRC (CB-CRC) is added to each code block and the code blocks are channel-coded through a turbo coder of a code rate 1/3. Although the TB-CRC and the CB-CRC equally have 24 bits, the TB-CRC and the CB-CRC are generated using different generation polynomials in order to improve reception performance. Code block segmentation will now be described in more detail with reference to FIG. 6.

Figure 6:
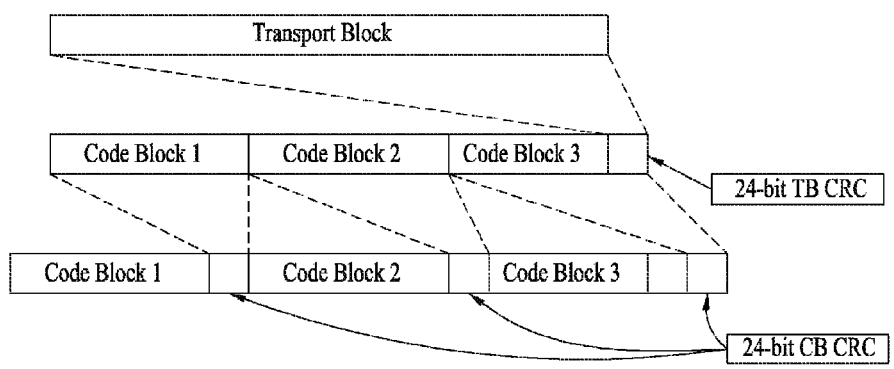
FIG. 6 is a diagram illustrating segmentation of a transport block.

Referring to FIG. 6, one transmission block is segmented into, for example, three code blocks. The three segmented code blocks should have the same or similar length. When the size of the transport block is given, bits capable of equally dividing the transport block should be found by precalculating the number of TB-CRCs and virtual CB-CRCs. One transport block may be segmented into code blocks having a maximum of two different lengths. In consideration of the size of an internal interleaver of the turbo encoder, the number and length of segmented code blocks should be determined by the number of bits capable of maximally filling the interleaver and may use only a defined size. A maximum value of the defined length of code blocks is 6144 bits.

Thereafter, each systematic information sequence and two parity information sequences generated from the turbo encoder are interleaved through a block interleaver. The two parity information sequences are interleaved in a manner of alternating one bit of the first parity information sequence and one bit of the second parity information sequence. Data coded through the above process is stored in a memory buffer for HARQ operation. The coded data is stored in a HARQ buffer in order of the interleaved systematic information and then the parity information sequences interleaved bit by bit.

Necessary information in the coded data after passing through the turbo encoder of a code rate of 1/3, stored in the HARQ buffer, is transmitted depending on a transmission code rate scheduled by an eNB according to a channel state of a UE. The HARQ buffer is a circular memory buffer. When information is read from the HARQ buffer, if it is necessary to further read information in a state in which information has been read up to the end of the HARQ buffer, information is read again starting from the first part of the HARQ buffer.

Data actually transmitted through a physical layer is information read from the HARQ buffer according to a transmission code rate and a redundancy version (RV) number. The transmission coding rate indicates the amount of data read from the HARQ buffer and the RV number indicates a start location at which data is read from the HARQ buffer. In LTE, four RVs RV0, RV1, RV2, and RV3 are defined. The start location of the HARQ buffer indicated by each RV is a location obtained by quadrisecting the entire HARQ buffer. Characteristically, the first RV is not the first start location and is started with a slight offset. Therefore, the start locations of the other RVs are defined as locations shifted by the offset.

After receiving channel quality information for each RB of each UE on uplink, the eNB may apply adaptive modulation and coding (AMC) to a PDSCH transmitted on downlink according to the channel quality information and, during retransmission, apply a modulation and coding scheme (MCS) different from an MCS during initial transmission because instantaneous channel quality of the UE is frequently changed. An MCS index is mapped to a modulation order and a TB length index. In LTE, 27 TB length indexes are defined with respect to each RB and, thus, TB lengths of a maximum of 27×110 cases are defined. A TB length is implicitly signaled through RB allocation information and the MCS index transmitted through a PDCCH to the UE.

A maximum TB length defined in an LTE system is 75376 bits when a TB is not spatially multiplexed in two layers and is 149776 bits when the TB is spatially multiplexed in the two layers. The maximum TB length defined when the TB is spatially multiplexed in the layers is a value defined to satisfy a peak rate of 300 Mbps which is achievable when 4×4 MIMO is used.

In the LTE system, it is assumed that the number of downlink transmit antennas is 1, 2, or 4 and the number of receive antennas is 2 or 4. Accordingly, if the number of transmit antennas is 2 or more, a multiple input multiple output (MIMO) system is used. The PDSCH may be multiplexed to a plurality of antennas and then transmitted. The PDSCH is also transmitted by spatial multiplexing and transmission diversity schemes according to a channel state and the number of codewords. In addition, a UE-specific RS for a specific UE is allocated to support beamforming for the UE.

Reference Signal (RS)

When a packet is transmitted in a wireless communication system, signal distortion may occur in a transmission process because the packet is transmitted through a radio channel. To correctly receive the distorted signal, a receiver should compensate for the distortion of a received signal using channel information. To obtain the channel information, a method for transmitting a signal known to both a transmitter and the receiver and acquiring the channel information based on the distortion of the signal received through the radio channel is mainly used. The signal is called a pilot signal or a reference signal (RS).

In the case of data transmission and reception using multiple antennas, a channel state between each transmit antenna and each receive antenna should be discerned in order to correctly receive a signal. Accordingly, an RS should be transmitted through each transmit antenna, more specifically, each antenna port.

The RS may be categorized into an uplink RS and a downlink RS. In the current LTE system, the uplink RS includes:

i) A demodulation reference signal (DM-RS) used for channel estimation for coherent demodulation of information transmitted through a PUSCH and a PUCCH, and ii) A sounding reference signal (SRS) used by an eNB or a network to measure uplink channel quality in a different frequency.

The downlink RS includes:

i) A cell-specific reference signal (CRS) shared among all UEs in a cell, ii) A UE-specific RS dedicated only to a specific UE, iii) A DM-RS used for coherent demodulation when a PDSCH is transmitted, iv) A channel state information-reference signal (CSI-RS) used for transmitting channel state information (CSI), when a downlink DM-RS is transmitted, v) A multimedia broadcast single frequency network (MBSFN) RS used for coherent demodulation of a signal transmitted in MBSFN mode, and vi) A positioning RS used to estimate geographic position information of a UE.

An RS may be categorized into two types according to purposes thereof: an RS for channel information acquisition and an RS for data demodulation. Since the purpose of the former is to cause the UE to acquire DCI, the RS for channel information acquisition should be transmitted in a broad band and be received even by a UE that does not receive downlink data in a specific subframe. The RS for channel information acquisition is also used in a situation such as handover. The RS for data demodulation is an RS that an eNB transmits together with downlink data in related resources. A UE can demodulate the data by measuring a channel using the RS for data demodulation. The RS for data demodulation should be transmitted in a data transmission area.

The CRS is used for two purposes, that is, channel information acquisition and data demodulation. The UE-specific RS is used only for data demodulation. The CRS is transmitted in every subframe in a broad band and the CRS for up to four antenna ports is transmitted according to the number of transmit antennas of the eNB.

For example, if the number of transmit antennas of the eNB is 2, CRSs for antenna ports 0 and 1 are transmitted. In the case of four transmit antennas, CRSs for antenna ports 0 to 3 are respectively transmitted.

FIG. 7 illustrates patterns in which CRSs and DRSs are mapped to a downlink RB pair, as defined in a legacy 3GPP LTE system (e.g. a Release-8 system). A downlink RB pair as an RS mapping unit may be expressed as one subframe in time by 12 subcarriers in frequency. That is, an RB pair includes 14 OFDM symbols in the time domain in the case of the normal CP (FIG. 7($a$)) and 12 OFDM symbols in the time domain in the case of the extended CP (FIG. 7($b$)).

FIG. 7 illustrates the positions of RSs on an RB pair in a system in which an eNB supports four transmit antennas. In FIG. 7, REs expressed by reference numerals '0', '1', '2', and '3' illustrates the positions of CRSs for antenna ports 0, 1, 2, and 3, respectively, and REs expressed by 'D' denote the positions of DM-RSs.

Channel State Information (CSI) Feedback

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver may perform beamforming based on CSI to obtain multiplexing gain of MIMO transmit antennas. The transmitter (e.g. eNB) may allocate an uplink control channel or an uplink shared channel to the receiver (e.g. UE) such that the receiver may feed back CSI.

CSI fed back may include a rank indicator (RI), a precoding matrix index (PMI), and a channel quality indictor (CQI).

The RI indicates information about a channel rank. The channel rank represents a maximum number of layers (or streams) through which different pieces of information may be transmitted through the same time-frequency resource. The RI is mainly determined by long term fading of a channel and, thus, the RI may be fed back at a longer period relative to the PMI and CQI.

The PMI is information about a precoding matrix used for transmission from the transmitter and is a value in which spatial characteristics of a channel are reflected. Precoding refers to mapping a transport layer to a transmit antenna. A layer-to-antenna mapping relation may be determined by a precoding matrix. The PMI indicates a precoding matrix index of an eNB preferred by a UE based on a metric such as signal-to-interference plus noise ratio (SINR). To reduce feedback overhead of precoding information, the transmitter and receiver may share a codebook including various precoding matrices and only an index indicating a specific precoding matrix in the codebook may be fed back.

In a system supporting an extended antenna configuration (e.g. LTE-A system), acquisition of additional multi-user diversity using multi-user MIMO (MU-MIMO) is considered. When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, in order to correctly perform MU-MIMO operation, more accurate CSI feedback than single user MIMO (SU-MIMO) needs to be fed back.

A new CSI feedback scheme that improves CSI composed of the RI, PMI, and CQI may be applied in order to measure and report more accurate CSI. For example, precoding information fed back by the receiver may be indicated by a combination of two PMIs. One (first PMI) of the two PMIs has long term and/or wideband attributes and may be referred to as W1. The other PMI (second PMI) of the two PMIs is short term and/or subband attributes and may be referred to as W2. A final PMI may be determined by a combination (or function) of W1 and W2. For example, if the final PMI is W, W may be defined as W=W1*W2 or W=W2*W1.

The CQI is information indicating channel quality or channel strength. The CQI may be represented by an index corresponding to a combination of predetermined MCSs. That is, a feedback CQI index may indicate a modulation scheme and a code rate. Generally, the CQI is a value reflecting a reception SINR capable of being obtained when the eNB configures a spatial channel using the PMI.

The current LTE/LTE-A system defines a CSI reference resource related to channel measurement for the above-described CSI feedback/reporting. In the frequency domain, the CSI reference resource is defined as a group of physical RBs corresponding to a frequency band with which a calculated CQI is associated. In the time domain, the CSI reference resource is defined as $n-n_{CQI\_ref}$ where n is a subframe in which the CSI is to be transmitted/reported. $n-n_{CQI\_ref}$ is i) the smallest value among values greater than or equal to 4, which is a valid downlink subframe for periodic CSI reporting, ii) a valid subframe corresponding to a subframe in which a CSI request in a DCI format is transmitted for aperiodic CSI reporting, or iii) 4 in the case of a CSI request in a random access response grant for aperiodic CSI reporting. A subframe is considered valid when it is configured as a downlink subframe for a particular UE, it is not a multicast broadcast single frequency network (MBSFN) subframe except for transmission mode 9, it contains a DwPTS with a predetermined size or more in TDD, it is not included in a measurement gap configured for the UE, and it should be an element of a CSI subframe set when that UE is configured with CSI subframe sets for periodic CSI reporting. CSI subframe sets ($C_{CSI,0}$, $C_{CSI,1}$) may be configured for the UE by a higher layer. The CSI reference resource may be included in any one of two subframes sets ($C_{CSI,0}$, $C_{CSI,1}$) hereinafter, $C_{CSI,0}$ is referred to as C0 and $C_{CSI,1}$ is referred to as C1, for convenience) but may not be included in both sets.

Heterogeneous Deployments

Figure 8:
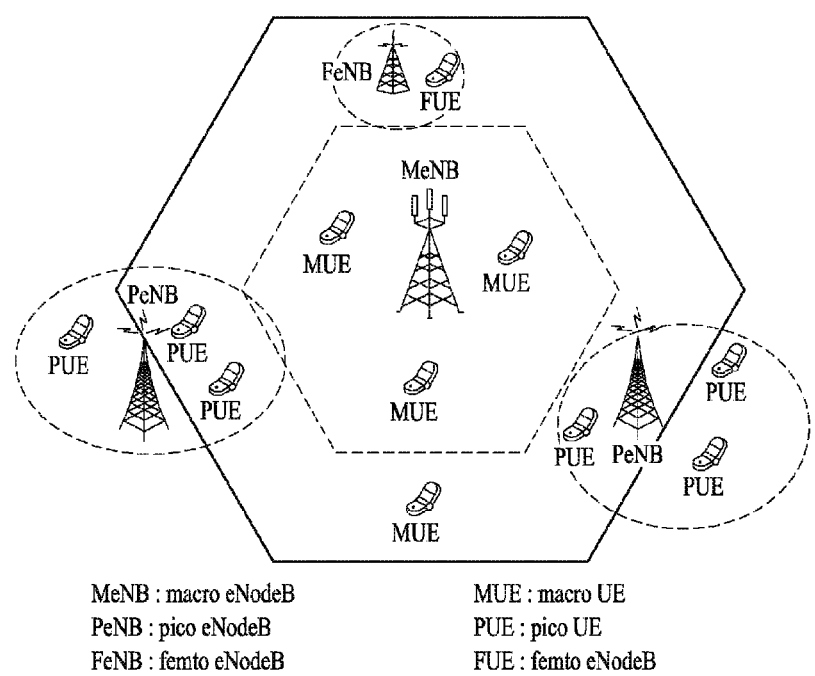
FIG. 8 is a diagram for explaining a cooperative transmission cluster.

FIG. 8 illustrates a heterogeneous network wireless communication system including a macro eNB (MeNB) and a micro eNB (a pico eNB (PeNB) or a femto eNB (FeNB)). In this document, the term heterogeneous network refers to a network in which an MeNB coexists with a micro eNB (PeNB or FeNB) even when the same radio access technology (RAT) is used.

The MeNB refers to a normal eNB of a wireless communication system, having broad coverage and high transmit power. The MeNB may also be referred to as a macro-cell.

The micro eNB (PeNB or FeNB) may also be referred to as, for example, a microcell, a picocell, a femtocell, a home eNB (HeNB), a relay, etc. (the exemplary micro eNB and MeNB may be collectively referred to as a transmission point). The micro eNB (PeNB or FeNB) is a small-sized version of the MeNB and can independently operate while performing most of the functions of the MeNB. The micro eNB (PeNB or FeNB) may be overlaid in an area covered by the MeNB or installed in a shadow area that the MeNB cannot reach. Compared to the MeNB, the micro eNB (PeNB or FeNB) may accommodate a small number of UEs with small coverage and low transmit power.

A UE may be directly served by the MeNB (hereinafter, such a UE is referred to as a macro-UE) or by the micro eNB (PeNB or FeNB) (hereinafter, such a UE is referred to as a micro-UE). In some cases, a micro-UE in the coverage of the PeNB may be served by the MeNB.

The micro eNB may be classified into two types depending on whether access from a UE is restricted.

The first type is an eNB of an open access subscriber group (OSG) or non-closed access subscriber group (non-CSG), which allows access from an existing macro-UE or from a micro-UE of a micro eNB. The existing macro-UE etc. may perform handover to an OSG eNB.

The second type is a CSG eNB. The CSG eNB does not allow access from an existing macro-UE or a micro-UE of a micro eNB. Thus, a UE cannot perform handover to a CSG eNB.

Coordinated Multi-Point (CoMP)

According to the improved system performance requirements of a 3GPP LTE-A system, CoMP transmission/reception technology (referred to as co-MIMO, collaborative MIMO, or network MIMO) is proposed. The CoMP technology can increase the performance of a UE located at a cell edge and increase average sector throughput.

In general, in a multi-cell environment in which a frequency reuse factor is 1, the performance of the UE located at the cell edge and average sector throughput may be reduced due to inter-cell interference (ICI). In order to reduce ICI, in the existing LTE/LTE-A system, a method of enabling the UE located at the cell edge to have appropriate throughput and performance using a simple passive scheme such as fractional frequency reuse (FFR) through UE-specific power control in an environment restricted by interference has been applied. However, rather than decreasing use of frequency resources per cell, ICI is preferably reduced or the UE reuses ICI as a desired signal. In order to accomplish the above object, a CoMP transmission scheme may be applied.

The CoMP scheme applicable to downlink may be largely classified into a joint processing (JP) scheme and a coordinated scheduling/beamforming (CS/CB) scheme.

In the JP scheme, each transmission point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of transmission points (a part or all of the CoMP unit). That is, data transmitted to a single UE may be simultaneously transmitted from a plurality of transmission points. According to the joint transmission scheme, it is possible to coherently or non-coherently improve the quality of received signals and to actively eliminate interference with another UE.

The dynamic cell selection scheme refers to a scheme for transmitting a PDSCH from one point (of the CoMP unit) at a time. That is, data transmitted to a single UE at a specific time is transmitted from one point and the other transmission points in the cooperative unit at that time do not transmit data to the UE. A transmission point for transmitting the data to the UE may be dynamically selected.

According to the CS/CB scheme, CoMP units may cooperatively perform beamforming of data transmission to a single UE. Although only a serving cell transmits the data, user scheduling/beamforming may be determined by coordination among cells of the CoMP unit.

In uplink, coordinated multi-transmission point reception refers to reception of a signal transmitted by coordination of a plurality of geographically separated transmission points. The CoMP scheme applicable to uplink may be classified into joint reception (JR) and coordinated scheduling/beamforming (CS/CB).

The JR scheme indicates that a plurality of reception points receives a signal transmitted through a PUSCH. Although the CS/CB scheme indicates that only one transmission point receives the signal transmitted through the PUSCH, user scheduling/beamforming is determined by coordination among the cells of the CoMP unit.

In this CoMP system, a UE may receive data commonly supported from multi-cell eNBs. In addition, the eNBs may simultaneously support one or more UEs using the same radio frequency resources, thereby increasing system performance. The eNBs may also operate in space division multiple access (SDMA) mode based on CSI between a UE and the eNBs.

A serving eNB and one or more cooperative eNBs are connected to a scheduler through a backbone network in the COMP system. The scheduler may receive channel information about channel states between a UE and the cooperative eNBs, measured by each cooperative eNB and operate based on the channel information. For example, the scheduler may schedule information for cooperative MIMO for the serving eNB and one or more cooperative eNBs. That is, the scheduler may directly command each eNB to perform cooperative MIMO operation.

As described above, it can be recognized that the CoMP system operates as a virtual MIMO system by grouping a plurality of cells into one group. Basically, the CoMP system adopts a MIMO communication scheme using multiple antennas.

A CoMP cluster is a set of cells that are capable of performing CoMP operation, that is, cooperative scheduling and cooperative data transmission/reception. For example, cells of a single cluster may be assigned different physical cell IDs (PCIDs) as shown in FIG. 9(a) and cells of a single cluster may share the same PCID as shown in FIG. 9(b) such that the cells may be configured in the form of a distributed antenna or RRH of a single eNB. As a modification of the above example, some cells from among cells of the single cluster may share the same PCID.

Generally, cells of the same CoMP cluster are interconnected through a backhaul link, such as an optical fiber having high capacity and low latency, so as to perform cooperative scheduling and cooperative data transmission/reception, such that cooperative scheduling is possible and maintained at a correct time synchronization state, resulting in implementation of cooperative data transmission. In addition, upon receiving signals from cells of the CoMP cluster participating in cooperative transmission, CoMP cluster size should be determined in a manner that a reception time difference between signals transmitted from respective cells is within the scope of a CP length of an OFDM symbol by a propagation delay difference between respective cells. In contrast, cells belonging to different clusters may be interconnected through a lower-capacity backhaul link and may not maintain time synchronization.

A UE configured to perform CoMP may perform cooperative scheduling and cooperative data transmission/reception by some or all of cells contained in the CoMP cluster and the UE may measure a reference signal that is transmitted from some or all cells of the CoMP cluster according to UE reception signal quality. In order to measure link performances of a UE and each cell, the UE may measure a reference signal of each cell and report signal quality of the measured reference signal. Specifically, cells to be measured by the UE may be defined as a CoMP measurement set.

For CoMP, there is a need to define the reference resource set through which UE channel measurement and UE channel measurement reporting are to be performed, because the CoMP scheme and downlink scheduling, etc. of the corresponding UE are determined according to per-cell channel information to be reported by the UE on uplink. Information as to from which cell the UE should measure/report signals, i.e. the CoMP measurement set, should be transmitted through higher layer signaling and may be signaled through a CSI-RS resource.

Inter-Cell Interference Coordination (ICIC)

In a heterogeneous network environment and/or a CoMP environment, interference between neighbor cells may occur. ICIC may be adopted to solve such an inter-cell interference problem.

As exemplary ICIC for a frequency resource, a 3GPP LTE Release-8 system defines a scheme for dividing an overall frequency region (e.g. system bandwidth) into one or more sub-regions (e.g. in units of physical resource blocks (PRBs)) and exchanging ICIC messages between cells in individual frequency sub-regions. For example, relative narrowband transmit power (RNTP) related to downlink transmit power, uplink interference overhead indication (IOI) related to uplink interference, and uplink high interference indication (HII) are defined as information included in the ICIC messages for frequency resources.

RNTP is information indicating downlink transmit power that a cell transmitting an ICIC message uses in a specific frequency sub-region. For example, if an RNTP field for a specific frequency sub-region is set to a first value (e.g. 0), this may mean that downlink transmit power of the corresponding cell does not exceed a predetermined threshold value in the corresponding frequency sub-region. Meanwhile, if the RNTP field for the specific frequency sub-region is set to a second value (e.g. 1), this may mean that the corresponding cell cannot promise downlink transmit power in the corresponding frequency sub-region. In other words, the RNTP field set to 0 can be regarded as low downlink transmit power of the corresponding cell in the corresponding frequency sub-region, whereas the RNTP field set to 1 cannot be regarded as low downlink transmit power of the corresponding cell in the corresponding frequency sub-region.

Uplink IOI is information indicating the amount of uplink interference that a cell transmitting an ICIC message experiences (or undergoes) in a specific frequency sub-region. For example, if an IOI field for the specific frequency sub-region is set to a value corresponding to the large amount of interference, this may mean that the corresponding cell experiences high uplink interference in the corresponding frequency sub-region. In the frequency sub-region corresponding to IOI indicating high uplink interference, a cell receiving the ICIC message may schedule a UE that uses low uplink transmit power from among UEs served thereby. Thus, since UEs perform uplink transmission at low transmit power in the frequency sub-region corresponding to IOI indicating high uplink interference, uplink interference experienced by a neighbor cell (i.e. a cell transmitting the ICIC message) may be reduced.

Uplink HII indicates the degree of interference (or uplink interference sensitivity) that may be generated in the corresponding frequency sub-region due to uplink transmission in a cell transmitting the ICIC message. For example, if an HII field is set to a first value (e.g. 1) in a specific frequency sub-region, this may mean that the cell transmitting the ICIC message has a possibility of scheduling a UE of high uplink transmit power in the corresponding frequency sub-region. On the other hand, if the HII field is set to a second value (e.g. 0) in a specific frequency sub-region, this may mean that the cell transmitting the ICIC message has a possibility of scheduling a UE of low uplink transmit power in the corresponding frequency sub-region. Meanwhile, a cell receiving the ICIC message may schedule a UE first in a frequency sub-region in which HII is set to the second value (e.g. 0) and schedule UEs capable of operating well even under high interference in another frequency sub-region in which HII is set to the first value (e.g. 1), thereby avoiding interference from a cell transmitting the ICIC message.

As exemplary ICIC for a time resource, the 3GPP LTE-A (or 3GPP LTE Release-10) system defines a scheme for dividing an overall time region into one or more sub-regions (e.g. in units of subframes) in the frequency domain and exchanging information indicating silencing or non-silencing between cells in individual time sub-regions. The cell transmitting the ICIC message may transmit information indicating that silencing is performed in a specific subframe to neighbor cells and does not schedule a PDSCH and a PUSCH in the corresponding subframe. On the other hand, the cell receiving the ICIC message may schedule uplink transmission and/or downlink transmission for a UE in a subframe in which silencing is performed in the cell transmitting the ICIC message.

Silencing may refer to operation through which a specific cell does not perform most of signal transmission (or transmission is performed at no power or low power) on uplink or downlink in a specific subframe. As an example of silencing operation, a specific cell may configure a specific subframe as an MBSFN subframe. In a downlink subframe configured as the MBSFN subframe, signals are transmitted only in a control region and no signals are transmitted in a data region. As another example of silencing operation, a cell generating interference may configure a specific subframe as an almost blank subframe (ABS) or an ABS-with-MBSFN. In a downlink subframe configured as the ABS, only a CRS is transmitted in a control region and a data region and the other control information and data are not transmitted (or transmission is performed only at low power). Notably, downlink channels and downlink signals such as a physical broadcast channel (PBCH), a primary synchronization signal (PSS), and a secondary synchronization signal (SSS) may be transmitted even in the ABS. ABS-with-MBSFN refers to a subframe in which even the CRS of the data region is not transmitted in the above-described ABS. Thus, silencing may be performed on a subframe basis and information indicating whether silencing is performed may be referred to as a silent subframe pattern.

In association with ABS, ABS signaling defined in 3GPP LTE-A is largely classified into ABS information and ABS status. The ABS information indicates a subframe to be used as ABS in the form of a bitmap. In FDD, the ABS information is composed of 40 bits. In TDD, the ABS information is composed of a maximum of 70 bits although the number of bits is changed according to uplink (UL)-downlink (DL) configuration. In the case of FDD, 40 bits indicate 40 subframes. If the value of a bit is set to 1, the bit indicates ABS. If the value of a bit is set to zero, the bit indicates non-ABS. When restricted measurement is configured for a UE, the number of CRS antenna ports of the corresponding cell is notified for CRS measurement. A measurement subset is a subset of ABS pattern information. The measurement subset is a bitmap composed of 40 bits in the case of FDD and is a bitmap composed of a maximum of 70 bits in the case of TDD. The measurement subset can be understood as a kind of a recommended restricted measurement for configuring restricted measurement for the UE. Table 1 indicates ABS information defined in the legacy LTE/LTE-A system.

TABLE 1

| IE/Group Name | Presence | Range | IE type and reference | Semantics description |
|---|---|---|---|---|
| CHOICE ABS Information | M | — | — | |
| >FDD | | | — | — |
| >>ABS Pattern Info | M | | BIT STRING (SIZE(40)) | Each position of bitmap represents a DL subframe, for which 1 indicates ABS and 0 indicates non-ABS. A first position of an ABS pattern corresponds to a subframe 0 in a radio frame of SFN = 0. A maximum number of subframes is 40. |
| >>Number Of Cell-specific Antenna Ports | M | | ENUMERATED (1, 2, 4, . . . ) | P—the number of antenna ports for cell-specific reference signals |
| >>Measurement Subset | M | | BIT STRING (SIZE(40)) | This indicates a subset of ABS pattern information and may be used to configure specific measurement for a UE. |
| >TDD | | | — | — |
| >>ABS Pattern Info | M | | BIT STRING (1 . . . 70, . . . ) | Each position of bitmap represents a DL subframe, for which 1 indicates ABS and 0 indicates non-ABS. A maximum number of subframes depends on UL/DL subframe configuration. A maximum number of subframes is 20 for UL/DL subframe configurations 1 to 5. A maximum number of subframes is 60 for UL/DL subframe configuration 6. A maximum number of subframes is 70 for UL/DL subframe configuration 0. A first position of an ABS pattern corresponds to Subframe 0 in a radio frame of SFN = 0 . ABS pattern is continuously repeated in all radio frames and restarts from SFN = 0. |

TABLE 1-continued

| IE/Group Name | Presence | Range | IE type and reference | Semantics description |
|---|---|---|---|---|
| >>Number Of Cell-specific Antenna Ports | M | | ENUMERATED (1, 2, 4, . . . ) | P—the number of antenna ports for cell-specific reference signals |
| >>Measurement Subset | M | | BIT STRING (1 . . . 70, . . . ) | This indicates a subset of ABS pattern information and may be used to configure specific measurement for a UE. |
| >ABS Inactive | M | | NULL | This indicates interference coordination when ABS is deactivated |

Table 2 shows ABS status information elements defined in the legacy LTE/LTE-A system. The ABS status information elements are used to enable the eNB to determine whether the ABS pattern should be changed. In Table 2, 'Usable ABS Pattern Info' is bitmap information of a subset of ABS pattern information and indicates whether a subframe designated as an ABS has been correctly used for interference mitigation. 'DL ABS status' indicates the ratio of the number of DL RBs scheduled in a subframe indicated by 'Usable ABS Pattern Info' to the number of RBs allocated for a UE to be protected through ABS. 'DL ABS status' may also indicate how to efficiently use the ABS in a victim cell according to unique purpose.

TABLE 2

| IE/Group Name | Presence | Range | IE type and reference | Semantics description |
|---|---|---|---|---|
| DL ABS status | M | | INTEGER (0 . . . 100) | This represents a percentage of ABS resources. The numerator of percentage calculation consists of RBs within ABS indicated by 'Usable ABS Pattern Info IE' allocated by eNB2. The denominator of percentage calculation is a total number of RBs within ABS indicated by 'Usable ABS Pattern Info IE'. |
| CHOICE Usable ABS Information | M | | — | — |
| >FDD | | | — | — |
| >>Usable ABS Pattern Info | M | | BIT STRING (SIZE(40)) | Each position of a bitmap represents a subframe, for which 1 indicates ABS and 0 indicates all other subframes. A pattern represented by the bitmap is a subset corresponding to ABS Pattern Info IE carried in LOAD INFORMATION from eNB. |
| >TDD | | | — | — |
| >>Usable ABS Pattern Info | M | | BIT STRING (1 . . . 70) | Each position of the bitmap represents a subframe, for which 1 indicates ABS and 0 indicates all other subframes. A pattern represented by bitmap is a subset corresponding to ABS Pattern Info IE carried in LOAD INFORMATION from eNB. |

A measurement subset composed of a subset of ABS patterns is a subframe statically used as ABS and it may be determined whether a transmission point autonomously uses the remaining subframes contained in the ABS pattern as the ABS according to traffic load.

Measurement/Measurement Report

A measurement report is used for one of many methods for ensuring mobility of UEs (handover, random access, cell search, etc.) or for the methods. Since the measurement report requires a certain degree of coherent demodulation, a UE may perform measurement after acquiring synchronization and physical layer parameters, except for measurement of received signal strength. The measurement report conceptually includes radio resource management (RRM) measurement of measuring signal strength of a serving cell and neighbor cells or signal strength to total receive power, such as reference signal receive power (RSRP), received signal strength indicator (RSSI), and reference signal received quality (RSRQ) and includes radio link monitoring (RLM) measurement of measuring link quality with respect to a serving cell to thereby determine whether a radio link has failed.

In association with RRM, RSRP is a linear average of power distribution of REs that carry downlink CRSs. RSSI is a linear average of the total receive powers of a UE. The RSSI is measured from OFDM symbols carrying RSs for antenna port 0 and is a measurement value including interference and noise power from neighbor cells. If a specific subframe is indicated for RSRQ measurement by higher-layer signaling, the RSSI is measured over all OFDM symbols contained in the indicated subframe. RSRQ is a value measured in the form of (N×RSRP/RSSI) where N is the number of RBs over the measurement bandwidth of RSSI.

The purpose of RLM execution is to enable a UE to monitor downlink quality of a serving cell thereof, such that the UE can determine 'in-sync' or 'out-of-sync' of the corresponding cell. In this case, RLM is based on a CRS. A DL quality estimated by the UE is compared with each of 'in-sync threshold (Qin)' and 'out-of-sync threshold (Qout)'. Each threshold value of Qin and Qout may be denoted by a PDCCH bock error rate (BLER) of a serving cell. Specifically, Qout and Qin may correspond to BLERs of 10% and 2%, respectively. Actually, Qin and Qout correspond to SINR of the received CRS. If CRS reception SINR is equal to or higher than a predetermined level (Qin), the UE decides to attach the corresponding cell. If CRS reception SINR is less than a predetermined level (Qout), the UE declares radio link failure (RLF).

As can be seen from the above-mentioned RSRP definition, it is presumed that measurement reporting is performed using the CRS. However, assuming that cells share the same PCID as shown in FIG. 9(b), the cells having the same PCID cannot be distinguished based on CRS, such that it is impossible to perform RRM of each cell using only measurement reporting including RSRP/RSRQ based on the CRS. Therefore, assuming that cells have the same PCID, it is possible to perform additional RSRP/RSRQ measurement reporting based on of an individually transmitted CSI-RS. In order to increase reception accuracy during CSI-RS reception of a specific cell, neighbor cells do not transmit signals to an RE to which the corresponding CSI-RS is transmitted, so that the UE may perform higher-accuracy measurement although the CRS-RS is less frequently transmitted than the CRS. Therefore, although cells have different PCIDs, both CRS-based RSRP/RSRQ measurement reporting and CSI-RS RSRP/RSRQ measurement reporting may be performed, resulting in increased accuracy of RRM of a network.

Another purpose of CSR-RS transmission in each cell is to perform CSI feedback to be performed by the UE to aid in scheduling of an eNB that determines a rank, precoding matrix, a modulation and coding scheme (MCS) or CQI to be used for DL data transmission between the corresponding cell and the UE. In accordance with the CoMP transmission scheme, the UE should feed back CSI to a DL related to a cooperative cell other than the serving cell. Since an excessive amount of overhead occurs when CSI of all cells contained in a CoMP cluster including the serving cell of the UE are fed back, CSI of some cells contained in the CoMP cluster that is valuable in cooperative scheduling and cooperative data transmission, that is, CSI of CoMP measurement set, may be configured to be fed back. Deciding the CoMP measurement set of a specific UE may be configured by selecting cells each having an RSRP of a predetermined level or higher. To this end, the UE performs RSRP measurement reporting of cells contained in the CoMP cluster including the UE. Alternatively, the eNB designates CSI-RS configurations through which the UE is to perform RSRP or RSRQ measurement as a CoMP measurement set and informs the UE of the resultant configurations. The UE may perform RSRP or RSRQ measurement of CSI-RSs transmitted from cells contained in the CoMP management set. If the measurement result satisfies a specific condition, the UE may perform reporting.

In order to implement ICIC between CoMP clusters, the UE performs RSRP measurement and reporting of cells contained in a contiguous CoMP cluster, so that the network and the UE may recognize which one of cells of the contiguous CoMP cluster generates strong interference with respect to the corresponding UE and also recognize which one of cells is subjected to strong UL interference from the corresponding UE.

In addition to CRS based RSRP/RSRQ measurement reporting for mobility management of UE handover, the CoMP measurement set configuration and the CSI-RS based RSRP/RSRQ measurement reporting for ICIC are simultaneously performed, thereby improving accuracy and flexibility of RRM of the network.

Restricted Measurement

If a cell reduces a transmit power of a specific resource region, a variation width of an interference signal received by a contiguous cell in each resource region is increased. If the interference signals are averaged irrespective of a resource region, it is difficult to correctly obtain CoMP and ICIC effects. A detailed description of this will be given with reference to FIG. 12.

Figure 12:
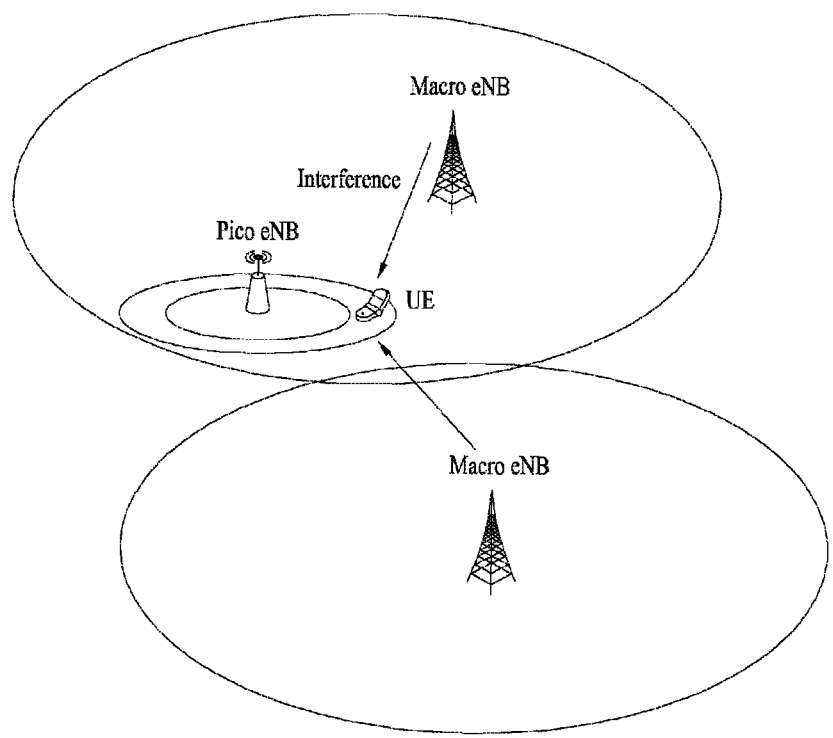
FIG. 12 is a diagram for explaining interference measurement according to an embodiment of the present invention.

Referring to FIG. 12, in a normal situation, a macro eNB functions as an aggressor cell of a pico eNB. The macro eNB can guarantee/protect performance of the pico eNB using the aforementioned ABS for the pico eNB of a victim cell or pico UE. Specifically, the macro eNB may deboost a maximum of 9 bB transmit power in specific subframe(s) or may not transmit signals in the specific subframe(s), resulting in cell range extension (CRE) of the pico eNB. In other words, if a macro eNB reduces a DL transmit power in the ABS, a UE located in the vicinity of a cell edge of cells may recognize improvement in performance of a received signal such that performance of a signal of the eNB received with a noise level or lower in a normal subframe is increased to a level at which data can be stably received in the ABS. Therefore, it may be recognized that cell coverage of the pico eNB is extended.

Under this situation, restricted measurement may be used for measurement reporting. In other words, if the macro eNB reduces a transmit power in a specific subframe through the ABS, signals and/or interference level of the pico eNB seen by the UE are greatly changed per subframe and simple averaging of signals is prevented due to introduction of restricted measurement.

For such restricted measurement, if several CSI subframe sets (e.g., C0 and C1 as described above) for channel measurement are indicated by a higher layer signal, the UE may perform channel measurement and reporting dedicated for a CSI subframe set. In addition, it is desirable that the UE perform measurement of the macro cell in the ABS for RLM/RRM.

Cell Range Expansion (CRE)

Several small-sized pico eNBs may be installed in coverage of a macro eNB, so that UEs served by the macro eNB are handed over to a pico eNB, resulting in traffic offloading of the macro eNB. Handover from a serving eNB to a target eNB is achieved when a measurement result of a UE for the target eNB is identical to or higher than a predetermined threshold value Sth_conv. In this case, a network may improve UE capability using arbitrary means, so that handover may be performed even though signal strength (e.g. SINR) of the target eNB is less than the predetermined threshold. The above-mentioned operation may be referred to as cell range expansion (CRE). A region/area in which CRE can be achieved is referred to as a CRE region/area and the CRE region may be represented by a specific region in which reception performance (Sreceived) of a reference signal of the corresponding eNB is higher than a new threshold value (Sth_CRE) for the CRE. That is, the CRE region is a region satisfying the following Equation 1.

$$S_{th\_conv} > S_{received} > S_{th\_CRE} \qquad \text{[Equation 1]}$$

Figure 9:
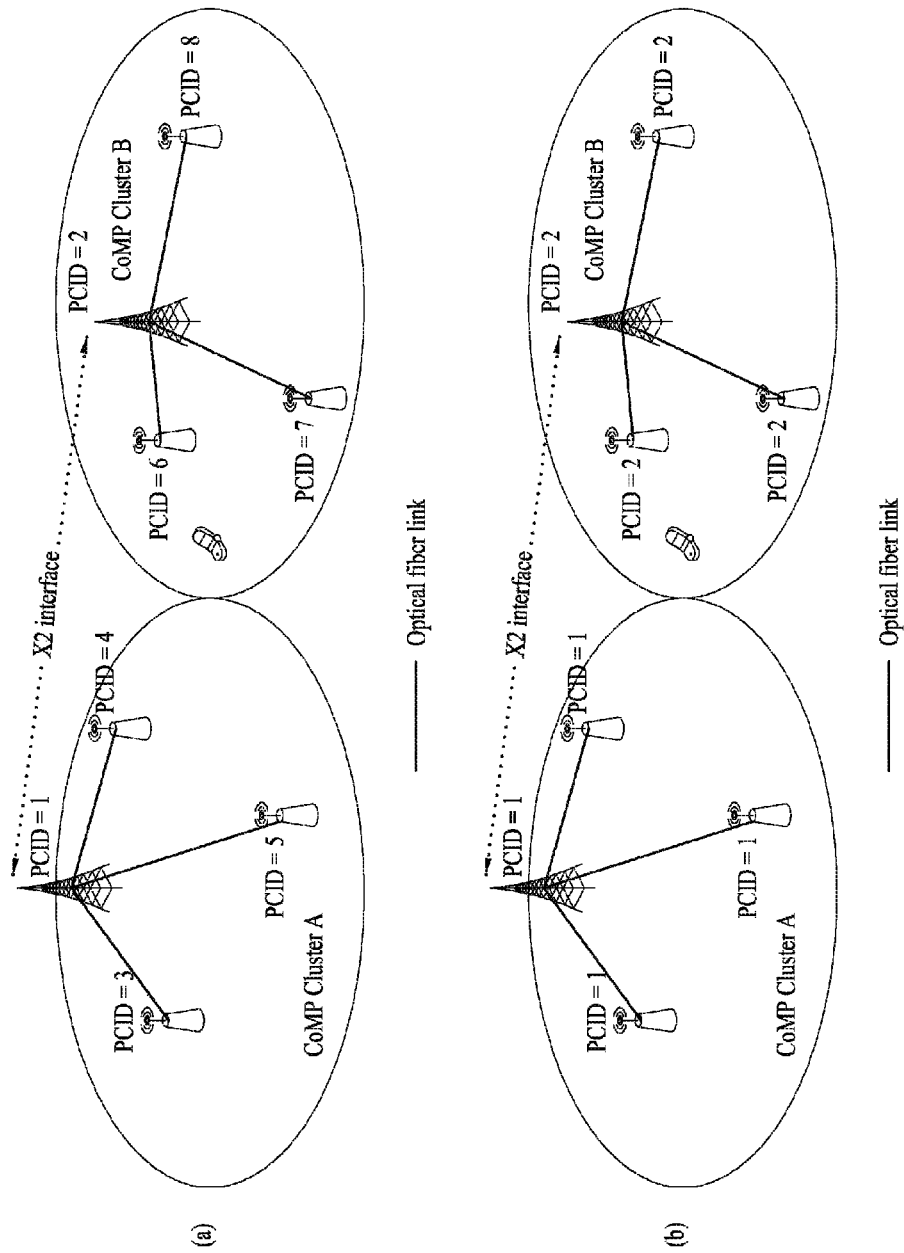
FIG. 9 is a diagram illustrating a CoMP cluster.
Figure 10:
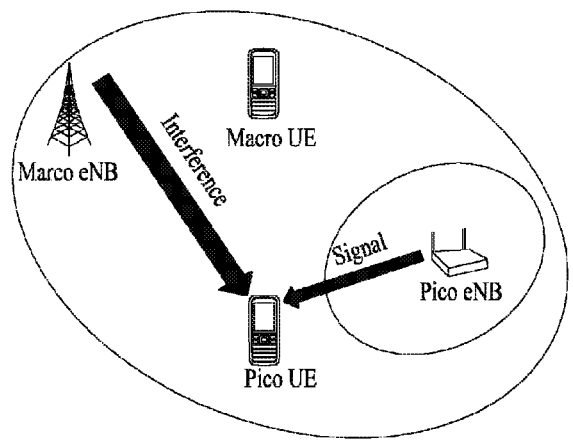
FIG. 10 is a diagram for explaining restricted measurement

For better understanding of the present invention, referring to FIG. 9, a CRE region configured to satisfy Equation 1 may correspond to a shaded part.

Figure 11:
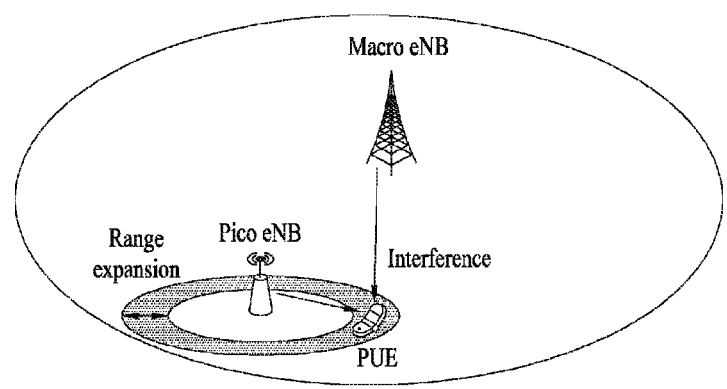
FIG. 11 is a diagram for explaining cell range expansion (CRE).

In FIG. 11, a macro eNB enables a UE (pico UE (PUE)) located in the CRE region to be handed over to a pico eNB, resulting in implementation of traffic offloading. As a result, overall system performance can be improved. The CRE can extend a cell range or a cell radius of the corresponding eNB.

In the legacy LTE/LTE-A system, a reference signal reception intensity of the pico eNB may be denoted by RSRP/RSRQ, a reference for enabling the UE to attach a specific cell satisfies a specific condition in which a difference between the best RSRP and a specific cell RSRP is 6 dB or less based on RSRP per cell. However, in order to increase the traffic offloading effect to the pico eNB, the reference may be adjusted to 6 dB or higher (e.g. 9 dB). In this case, influence of interference caused by the macro eNB (including other eNBs that are located close to the pico eNB but are not shown in the drawings) may be further increased unavoidably, when the UE measures the pico eNB, performs handover to the pico eNB for the CRE, and then measures the pico eNB acting as a serving cell.

Therefore, the following description proposes methods for solving various interference problems encountered when a reference is higher than the CRE reference.

In the following description, a UE may have further enhanced ICIC (FeICIC) capability capable of supporting FeICIC. In this case, FeICIC means that a pico eNB performs time/frequency ICIC together with a macro eNB while performing CRE of 6 dB or more. UE capabilities related to FeICIC capability may include CRS interference cancellation (CRS IC) capability (including information about the number of CRSs to cancel, i.e. information about the number of CRSs capable of being cancelled in one subframe or about how many cells can be CRS-cancelled) capable of cancelling CRS interference, PSS/SSS IC capability (including information about the number of PSSs/SSSs to cancel, i.e. information about the number of PSSs/SSSs capable of being cancelled in one subframe or about how many cells can be PSS/SSS-cancelled) capable of cancelling PSS/SSS interference of a contiguous cell, and PBCH IC capability (including information about the number of PBCHs to cancel, i.e. information about the number of PBCHs capable of being cancelled in one subframe or about how many cells can be PBCH-cancelled) capable of cancelling PBCH interference of a contiguous cell (hereinafter, the UE capability related to FeICIC capability will be referred to as CRE-related capability). Information about CRE-related capability of the UE may be transmitted from the UE to a core network after RRC connection. More specifically, after RRC connection of the UE, the core network transmits UECapabilityEnquiry to the UE through non-access stratum (NAS) signaling and the UE transmits UE capability information in response to UECapabilityEnquiry. The core network may transmit UECapabilityEnquiry whenever necessary.

In the following description, the term measurement refers to measurement of at least one of RRM/RLM/CSI unless specifically mentioned otherwise. A neighbor cell and a serving cell which are subjected to interference may be referred to as weak cells or victim cells and cells causing interference may be referred to as aggressor cells.

CRS Handling Method of UE in Interference Situation and CRS Information of Neighbor Cell Although a UE of a pico eNB may receive, through an ABS of a macro eNB, data/control channel in a corresponding subframe in an environment in which interference of the macro eNB is relieved, interference caused by a CRS of the macro eNB is not reduced. In this case, the UE can improve reception performance thereof through a CRS interference cancellation/suppression scheme for cancelling/suppressing a CRS interference signal of the macro eNB.

To cancel/suppress CRS interference of the macro eNB, the UE should be aware of CRS information of a neighbor cell. That is, for CRS handling of the neighbor cell (CRS handling collectively refers to schemes for cancelling or suppressing CRS interference of the macro eNB and includes interference cancellation at a receiver, rate matching at a transmitter, and suppression or puncturing at the receiver and transmitter), the UE needs to receive a cell ID of each cell for which CRS handling should be performed, number of CRS ports, information about a subframe in which a CRS is transmitted (e.g. MBSFN configuration), and information about bandwidth over which a CRS of a corresponding cell is transmitted. Therefore, the macro eNB may transmit the above CRS information to the UE and the UE which has received the CRS information may perform CRS handling only in a subframe, bandwidth, and RE in which a CRS acting as interference is transmitted.

A message transmitting the CRS information, NeighborCellCRSInformation, may be defined as in Table 4.

TABLE 4

| NeighboCellCRSInformation ::= CHOICE { |
| Cell ID |
|     { number of CRS ports, |
|     frequency information of CRS transmission, |
|     time information of CRS transmission } |
| } |

Multiple cell IDs may be transmitted through NeighborCellCRSInformation. The number of CRS ports per cell ID, frequency information of CRS information, and time information of CRS transmission may also be transmitted through NeighborCellCRSInformation. The number of CRS ports per specific cell ID is an indispensable transmission element but the frequency information of CRS transmission and the time information of CRS transmission may be optionally transmitted. The frequency information of CRS transmission is information about frequency over which the CRS is transmitted and may be denoted by information about a center frequency and bandwidth of a specific cell or the number and position of PRBs in which the CRS is transmitted. The time information of CRS transmission is information about time at when the CRS is transmitted and may be denoted by a subframe in which the CRS is transmitted. The time information includes, for example, an MBSFN subframe configuration.

A certain cell may not configure an MBSFN subframe at all so that it may be not possible to inform a UE of MBSFN subframe configuration of the cell. Alternatively, although a specific cell configures the MBSFN subframe, other cells may not update information regarding the MBSFN subframe configuration because eNBs do not exchange real-time information through an X2 interface, so that a serving cell is not aware of the MBSFN subframe configuration of the specific cell and does not transmit the information about the MBSFN subframe configuration.

Accordingly, if the UE receives only the number of CRS ports of the specific cell and does not receive the MBSFN subframe configuration, the UE may assume that the cell uses all subframes as MBSFN subframes or, conversely, that the cell uses all subframes as normal subframes. According to this assumption, the UE may perform CRS cancellation/relief/puncturing/suppression of the cell only in a normal subframe. However, if the UE performs CRS interference cancellation under the assumption that a neighbor cell uses a normal cell and that a CRS of the cell is present in a situation in which the neighbor cell uses an MBSFN subframe and the CRS is not present, an error of channel estimation is further increased. Therefore, if the UE does not know the MBSFN subframe configuration of the neighbor cell, it is desirable that the UE assume that the neighbor cell is configured as an MBSFN subframe rather than a normal subframe.

As another embodiment, when the UE receives only the number of CRS ports of a neighbor cell and does not receive the MBSFN subframe configuration, the UE may perform only CRS puncturing without cancelling CRS interference under the assumption that the neighbor cell uses all subframes as normal subframes.

As another embodiment, when an eNB is not aware of the MBSFN subframe configuration of the neighbor cell, although the eNB may not transmit the MBSFN subframe configuration of the neighbor cell as described above, the eNB may cause the UE to perform designated operation by transmitting arbitrary configuration information to the UE. For example, when the eNB which is not aware of MBSFN subframe configuration of a specific cell transmits MBSFN subframe configuration information to the UE, the eNB may inform the UE that all subframes of the cell are normal subframes (or MBSFN subframes).

As another embodiment, the eNB may signal information indicating whether a neighbor cell certainly configures an MBSFN subframe. The information may include information capable of guaranteeing the MBSFN subframe configuration of a neighbor cell and/or information about a subframe incapable of guaranteeing the MBSFN subframe. Upon receiving the information, the UE may not use a CRS handling scheme in an MBSFN subframe of a specific cell and may perform the CRS handling scheme (e.g. interference cancellation, rate matching at a transmitter, suppression, or puncturing) in a normal subframe other than the MBSFN subframe. Meanwhile, in a subframe about which a serving cell cannot guarantee that a specific eNB certainly configures the subframe as the MBSFN subframe, the UE may use a scheme such as puncturing without using interference cancellation among CRS handling schemes.

Interference Measurement Method of UE when Restricted Measurement is Configured

Hereinafter, CRS handling of a UE and necessary information/operation will be described in the case in which CRSs of multiple cells collide (hereinafter, this case is referred to as a CRS collision case) because a CRS of a serving cell of the UE and a CRS of a macro eNB in the vicinity of the UE are transmitted at the same position. Especially, when restricted measurement is configured, an interference measurement method of the UE will be described.

The following description can be applied to a UE in an environment as illustrated in FIG. 12. In more detail, referring to FIG. 12, a UE belongs to a region of a serving cell, i.e. a pico eNB, (which may be a CRE region) and may be subjected to interference by neighbor macro eNBs (macro eNB 1 and macro eNB 2). The macro eNBs neighboring on the pico eNB may be cooperative eNBs through a scheme such as ABS, RNTP, HII, IOI, etc. As opposed to FIG. 12, cells neighboring on the pico eNB may form one CoMP cluster. In addition, the following description is premised on the case in which a CRS of a serving cell of a UE and a CRS of a macro eNB neighboring on the UE are transmitted at the same position and thus CRSs of multiple cells collide (hereinafter, this case is referred to as a CRS collision case).

In performing interference measurement for CSI calculation of the UE (having interference cancellation capability), the UE may perform CRS interference cancellation through the above-described CRS information (NeighborCellCRS-Information) of a neighbor cell and perform channel estimation based on the CRS information, thereby demodulating CSI and data. In this case, interference I to be measured may be expressed as Equation 2.

$$I = I_0 + I_{N\_CRS} \qquad \text{[Equation 2]}$$
$$= I_0 + \sum_k I_{C,k}$$

In Equation 2, I denotes interference measured at a CRS position of a serving cell, $I_0$ denotes interference other than CRS interference of the neighbor cell from total interferences, and $I_{N\_CRS}$ denotes interference from a specific eNB. Specifically, in the CRS collision case, $I_{N\_CRS}$ is CRS interference caused by a CRS of the neighbor cell transmitted at a CRS position of the serving cell of the UE and may be the sum of CRS interferences of multiple cells in the CRS collision case. In this case, the CRS interferences of multiple cells constituting $I_{N\_CRS}$ mean CRS interferences of cells corresponding to cell IDs colliding with a CRS of the serving cell among cell IDs in a cell ID list provided by the CRS information of the neighbor cell. The UE may recognize which cell's CRS collides with a CRS of the serving cell thereof based on the CRS information of the neighbor cell received from the serving cell and measure and calculate interference of the colliding CRSs. $I_{C,k}$ denotes CRS interference of a k-th cell colliding with the CRS of the serving cell.

Equation 2 may be written by Equation 3 indicated below.

$$I = I_0 + I_{C,k} \qquad \text{[Equation 3]}$$
$$= I_0 + \sum_k \Delta_k \cdot I_{N\_CRS,k}$$

In Equation 3, $I_{C,k}$ denotes CRS interference of a k-th cell colliding with the CRS of the serving cell and is a value corrected by $\Delta_k$ which is a value capable of reflecting actual interference according to a subframe or measurement subframe subset. $I_{N\_CRS,k}$ represents CRS interference of a k-th neighbor cell. $\Delta_k$ represents a weighting factor for correction of $I_{N\_CRS,k}$ and is a value capable of determining how much $I_{N\_CRS,k}$ is reflected during actual interference calculation. $\Delta_k$ is a value representative of a specific interference environment and may be defined as a subframe-specific value, in consideration of the fact that CRS interference cancellation only based on the CRS information of the neighbor cell received by the UE may have difficulty performing accurate CSI reporting. In more detail, this is because interference of the neighbor cell in a PDSCH region still remains although the UE may cancel interference caused by the CRS of the neighbor cell by performing CRS interference cancellation. Accordingly, the ratio of PDSCH EPRE to CRS EPRE of the neighbor cell or a correction value which is information corresponding to traffic loading, etc. may be applied.

In the above description, when restricted measurement is configured for the UE, that is, when a first subframe set C0 related to an ABS and a second subframe set C1 related to a normal subframe are configured for the UE, the weighting factor (i.e. correction value) for correction may be set per subframe set (i.e. per measurement subset). For example, $\Delta_k = \Delta_{k,C0}$ in measurement subset C0 and $\Delta_k = \Delta_{k,C1}$ in measurement subset C1.

Thus, a correction value is set per measurement subset, interference measurement of the UE in each subset (C0 or C1) may be performed as follows.

The UE may calculate CSI using interference appearing after cancellation of a CRS of a neighbor macro eNB in measurement subset C0, correct the CSI using a value $\Delta_{k,C0}$ capable of reflecting actual interference, and then report the corrected CSI to an eNB. For CSI measurement of the UE for measurement subset C1, the UE may calculate CSI using interference appearing after cancellation of the CRS of the neighbor macro eNB, correct the CSI using a value $\Delta_{k,C1}$ capable of reflecting actual interference in the measurement subset, and then report the corrected CSI to an eNB. Since the correction values $\Delta_{k,C0}$ and $\Delta_{k,C1}$ for reflecting actual interference indicate interference characteristics, the values may differ according to each measurement subset and may be expressed as the ratio of PDSCH EPRE to CRS EPRE of each measurement subset.

Especially, a correction value in a specific measurement subset that neighbor cells use as a normal subframe may be 1 (ratio of PDSCH EPRE to CRS EPRE ($\rho_A$, $\rho_B$) in a normal subframe) and a correction value in a specific measurement subset that neighbor macro eNBs use as an ABS may be 0 (ratio of PDSCH EPRE to CRS EPRE ($\rho_A'$, $\rho_B'$) in a subframe in which a PDSCH is not scheduled). That is, $\Delta_{k,C0}$ may be a value corresponding to the ratio of PDSCH EPRE to CRS EPRE of a k-th cell in measurement subset C0 and $\Delta_{k,C1}$ is a value corresponding to the ratio of PDSCH EPRE to CRS EPRE of a k-th cell in measurement subset C1.

$\Delta_{k,C0}$ and $\Delta_{k,C1}$ may be included in the above-described CRS information of a neighbor cell and then be transmitted to the UE. Table 5 shows elements of the CRS information of the neighbor cell.

TABLE 5

```
NeighborCellCRSInformation ::=    CHOICE {
    Cell ID
        { number of CRS ports,
          frequency information of CRS transmission,
          time information of CRS transmission,
          delta_C0,
          delta_C1 }
}
```

In Table 5, delta_C0 ($\Delta_{k,C0}$) is a value corresponding to the ratio of PDSCH EPRE to CRS EPRE in a subframe set that an eNB of a corresponding cell ID uses as an ABS and delta_C1 ($\Delta_{k,C1}$) is a value corresponding to the ratio of PDSCH EPRE to CRS EPRE in a subframe set that the eNB of the corresponding cell ID uses as a normal subframe.

Meanwhile, $\Delta_{k,C0}$ and $\Delta_{k,C1}$ are values capable of being representative of interference and load information per measurement subset. These values may be transmitted through higher-layer signaling.

The values $\Delta_{k,C0}$ and $\Delta_{k,C1}$ may be, for example, 0 and 1, respectively. When $\Delta_{k,C0}$=0, this value is representative of interference when neighbor cells schedule a PDSCH at a reduced transmit power (including the case in which a PDSCH transmit power of neighbor cells is 0). When $\Delta_{k,C0}$=1, this value is representative of interference when neighbor cells schedule a PDSCH without reducing a transmit power and, in this measurement subset, CRS interference cancellation for a CRS collision case may not be performed.

In this case, an ABS configuration flag may be included in a NeighborCellCRSInformation message transmitting CRS information of a neighbor cell, as a signal indicating whether a corresponding cell cooperatively performs ABS configuration per cell ID with a serving cell.

TABLE 6

```
NeighborCellCRSInformation ::=    CHOICE {
    Cell ID
        { number of CRS ports,
          frequency information of CRS transmission,
          time information of CRS transmission,
          ABS configuration flag}
}
```

For a cell ID in which the ABS configuration flag is set, if a CRS of a corresponding cell collides with a CRS of a serving cell, the UE cancels the CRS of the corresponding cell in measurement subframe subset C0 and corrects interference from a corresponding cell using $\Delta_{k,C0}$, for example, $\Delta_{k,C0}$=0. For a cell ID in which the ABS configuration flag is not set, if a CRS of a corresponding cell and a CRS of a serving cell collide, the CRS of the corresponding cell is not cancelled in measurement subframe subset C0 or, even when cancellation is performed, a correction value cannot be 0 and may be, for example, $\Delta_{k,C0}$=1. This is because there is possibility of not using the ABS in measurement subframe subset C0 (a subframe set in which a neighbor macro eNB uses the ABS) of the corresponding cell.

Thus, when the ABS configuration flag is additionally signaled, a correction value for interference may be determined according to the ABS configuration flag.

That is, if the ABS configuration flag of a specific cell is set to 0 (the case in which the corresponding cell uses the ABS and does not cooperate with a serving cell), a correction value of the corresponding cell corresponds to $\Delta_{k,C0}$=$\Delta_{k,C1}$ and may have a common value in measurement subframes. In this case, since CRS interference cancellation of the corresponding cell is not meaningful in all measurement subframe subsets, the UE may calculate CSI without using CRS interference cancellation or additional interference mitigation of the corresponding cell.

If the ABS configuration flag of a specific cell is set to 1 (the case in which the corresponding cell uses the ABS and cooperates with the serving cell), an interference correction value of the corresponding cell may have an independent value per measurement subframe subset. In addition, for this cell, it may be desirable that the UE measure interference without cancelling CRS interference of the corresponding cell, in a subframe set which is used as a normal subframe for scheduling a PDSCH by the corresponding cell without reducing a transmit power, i.e. in measurement subframe subset C1. The UE may assume that an interference correction value $\Delta_{k,C1}$ in measurement subframe subset C1 is 1 (assume that ratio of PDSCH EPRE to CRS EPRE is 1) without additional signaling and only an interference correction value $\Delta_{k,C0}$ in measurement subframe subset C0 may be signaled to the UE.

Figure 13:
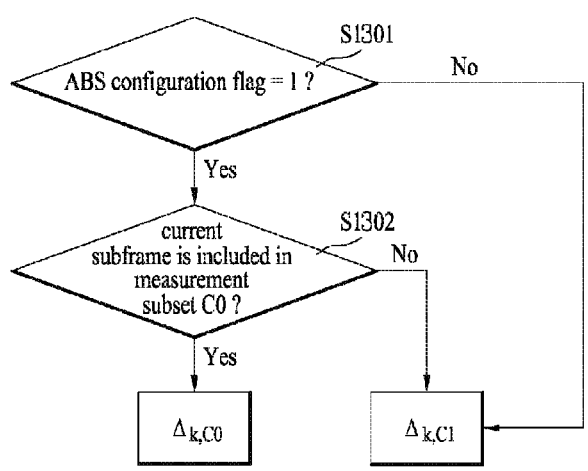
FIG. 13 is a flowchart for explaining correction value determination according to an embodiment of the present invention.

If both the above-described ABS configuration flag and the correction value per measurement subset are signaled, the correction value may be determined as shown in FIG. 13. Referring to FIG. 13, the UE checks the value of the ABS configuration flag in step S1301. If the value of the ABS configuration flag is 1, the UE determines to which one of measurement subsets C0 and C1 a current subframe belongs in step S1302. In other words, the UE determines whether the current subframe belongs to measurement subset C0. If the current subframe belongs to measurement subset C0, the UE may determine the correction value as $\Delta_{k,C0}$. If the current subframe belongs to measurement subset C1, the UE may determine the correction value as $\Delta_{k,C1}$. If the ABS configuration flag is not set to 1, the UE may determine the correction value as $\Delta_{k,C1}$ in all measurement subsets.

As described earlier, the ratio of PDSCH EPRE to CRS EPRE for each cell for which CRS interference should be cancelled may be signaled to the UE, the UE may perform CRS interference cancellation of a specific cell in a CRS collision case, and then the UE may correct actual interference using the ratio of PDSCH EPRE to CRS EPRE of the specific cell. However, an average interference correction value per measurement subset may be signaled for CSI measurement in consideration of signaling overhead. The UE may calculate CSI by correcting actual interference using a different value per measurement subset after CRS interference cancellation according to the average value.

That is, Equations 2 and 3 may approximate to Equation 4.

$$I = I_0 + I_{N\_CRS} \quad \{Equation\ 4\}$$
$$\approx I_0 + \Delta \cdot \sum_k I_{N\_CRS,k}$$
$$= I_0 + \Delta \cdot I_{N\_CRS}$$

In Equation 4, $\Delta$ may equal $\Delta_{C0}$ in measurement subset C0 and $\Delta$ may equal $\Delta_{C1}$ in measurement subset C1. $\Delta_{C0}$ is a representative value for correcting interference of cells in which CRS positions collide in measurement subset C0 and $\Delta_{C1}$ is a representative value for correcting interference of cells in which CRS positions collide in measurement subset C1.

If the correction value is not explicitly signaled, the UE may calculate CSI under the assumption that the ratio of PDSCH EPRE to CRS EPRE is 1 (PDSCH EPRE=CRS EPRE) of a neighbor cell in order to perform CSI measurement in a subframe set used as a normal subframe by a neighbor macro eNB.

Alternatively, the UE may assume that the ratio of PDSCH EPRE to CRS EPRE of a serving cell thereof in each measurement subframe subset is applied even to a neighbor cell. In this case, as another method for calculating neighbor interference, the UE may calculate CSI using interference after cancellation of only a CRS of the serving cell thereof without calculating interference through CRS interference cancellation. Then, operation and signaling for additional interference correction may be unnecessary.

Alternatively, for CSI measurement in a subframe set used as a normal subframe by a neighbor macro eNB, the UE may perform interference measurement without performing CRS interference cancellation, measure interference after performing CRS interference cancellation of corresponding cells only in a subframe set used as an ABS by the neighbor macro eNBs, and then calculate CQI by correcting actual interference using an additional value ($\Delta$).

Alternatively, the UE may calculate interference by measuring the ratio of PDSCH EPRE to CRS EPRE of a neighbor cell without additionally signaling the correction value ($\Delta_k$). That is, the UE may measure a power on an OFDM symbol having no CRS. If the measured value is less than by a given level than a power of an OFDM symbol including the CRS, the UE needs to measure interference after CRS cancellation of a corresponding cell under the assumption that the corresponding cell uses the ABS. If the measured value is maintained at a similar level, the UE may calculate CQI without cancelling the CRS of the cell.

Although the above description has been given on the premise that the serving cell of the UE is the pico eNB, the above-described operation and signaling is applied even when the UE is served by the macro eNB. If a plurality of measurement sets is configured for CSI calculation of a macro UE, interference correction and signal correction should be simultaneously performed for CSI calculation. Namely, if a measurement subset representative of interference characteristics is configured for the macro UE in a network in which a macro eNB cooperatively uses an ABS, the UE may perform interference/signal correction operation per measurement subset for CSI calculation after CRS interference cancellation of a neighbor cell. For example, if two measurement subsets C0 and C1 are configured (C0 corresponds to a subframe used as an ABS by macro eNBs including a serving cell of the UE and C1 corresponds to a subframe used as a normal subframe by neighbor macro eNBs including the serving cell) and a PDSCH transmit power of the serving cell is reduced in C0, an interference level is also reduced according to the same operation of the neighbor macro eNBs.

The UE corrects interference using value $\Delta_{C0}$ capable of reflecting actual interference with respect to interference appearing after cancelling CRS interference of a neighbor cell and calculates CSI by correcting a signal of a serving cell thereof based on the ratio of PDSCH EPRE to CRS EPRE of the serving cell in measurement subset C0 after CRS estimation of the serving cell. For CSI measurement in measurement subset C1, the UE corrects interference using value $\Delta_{C1}$ capable of reflecting actual interference with respect to interference after cancelling CRS interference of the neighbor cell. However, CRS cancellation for CSI measurement in a measurement subframe subset represented as the normal subframe may be not very meaningful. For more accurate interference measurement, the UE may calculate CSI using interference appearing after cancelling the CRS of the serving cell, so that calculation complexity can be lowered and accuracy of interference measurement can be raised.

Meanwhile, the case in which the UE does not perform CRS interference cancellation has been described hereinabove and this case may be explicitly signaled. In more detail, when calculating CSI, the UE may signal an interference suppress flag indicating whether the UE should perform CRS interference cancellation with respect to each measurement subset.

The interference suppress flag may be determined according to the number of measurement subsets and may be expressed as, for example, two bits {b1, b2} when there are two measurement subsets. In this case, b1 may indicate whether to cancel CRS interference of a corresponding cell in measurement subset C0 and b2 may indicate whether to cancel CRS interference of a corresponding cell in measurement subset C1. In this case, a detailed example is shown in Table 7.

TABLE 7

| Interference suppress flag | interpretation |
| --- | --- |
| 00 | CRS IC is not allowed in measurement subset C0 and C1 |
| 01 | CRS IC is not allowed in measurement subset C0 CRS IC is allowed in measurement subset C1 |
| 10 | CRS IC is allowed in measurement subset C0 CRS IC is not allowed in measurement subset C1 |
| 11 | CRS IC is not allowed in measurement subset C0 CRS IC is not allowed in measurement subset C1 |

If there are two measurement subsets and the interference suppress flag is composed of only one bit, the interference suppress flag may be configured to indicate only whether CRS interference cancellation of a corresponding cell should be performed in measurement subset C1. In more detail, if measurement subset C0 is related to an ABS and measurement subset C1 is related to a normal subframe, the interference suppress flag may indicate whether to perform CRS interference cancellation in measurement subset C1 while indicating that CRS interference cancellation should be performed in measurement subset C0 by default.

Hereinafter, rate matching among CRS interference handling schemes at a transmitter will be described.

An eNB may perform rate matching for a resource region corresponding to a CRS of a neighbor cell in a PDSCH region based on CRS information of the neighbor cell adjacent thereto. The eNB may transmit the CRS information in the form of a neighbor cell information message (NeighborCellCRSInformation) to the UE. Upon receiving the message, the UE is aware that a PDSCH of a serving cell thereof will be rate-matched and the eNB may indicate which position (RE) will be rate-matched through subframe information including cell IDs of the neighbor cells, a CRS port number, and a CRS.

As another example, the eNB may transmit an indicator indicating whether serving cell data has been mapped to positions of all CRSs of a neighbor cell designated by the neighbor cell information message, so that the UE may perform data recovery operation corresponding to the indicator.

As another example, the eNB may inform the UE of an actual rate matching position of a PDSCH in the neighbor cell information message through an additional indicator. That is, upon receiving CRS information of a neighbor cell, the UE may perform operation such as CRS interference cancellation or puncturing using information of the neighbor cell information message according to receiver capability thereof. Meanwhile, the eNB may inform the UE of an additional indicator indicating which cell's CRS is rate-matched so that the UE may avoid CRS interference from a specific cell by rate matching a specific RE while receiving the PDSCH. The additional indicator may be a cell ID list of cells performing rate matching while the eNB maps the PDSCH.

As another example, a rate matching flag may be added to the neighbor cell information message so that the UE may be informed of a CRS position of a cell at which a PDSCH of a serving cell is rate-matched. The rate matching flag indicates whether the PDSCH is rate-matched at a CRS position of a specific cell. In this case, the UE may use an interference mitigation scheme at a receiver only at CRS positions of cells for which the rate matching flag is not set.

In the above description, the rate matching flag may indicate whether there is possibility that a CRS position of a corresponding cell can be rate-matched during PDSCH mapping. That is, even if the rate matching flag has been set, this does not always mean that a PDSCH of the corresponding cell has been rate matched and may mean that the PDSCH may be rate-matched. Whether rate matching is performed during actual PDSCH transmission may be indicated by a combination of DCI and information defined by RRC signaling.

In more detail, the UE may perform CRS cancellation for a CRS of a corresponding cell by regarding a cell ID included in NeighborCellCRSInformation as an interference source. A cell ID for which CRS cancellation will be performed may correspond to a cell ID except for a cell ID for which rate matching is confirmed. That is, if there is signaling indicating that rate matching has been performed, the UE does not perform CRS IC operation for the corresponding cell even when the cell is contained in an aggressor cell list. Confirmation or indication of completion of rate matching may be indicated by a 'Rate matching indicator bit'/'PDSCH RE mapping and Quasi Co Location Indicator' field of a DCI format. In more detail, information about a variety of rate matching patterns such as a specific cell ID, the number of CRS ports, and MBSFN configuration is configured for the UE through RRC signaling and any one of the multiple rate matching patterns is indicated by the DCI format.

PDSCH RE Mapping of eNB/Transmission Point in CoMP Environment

Figure 14:
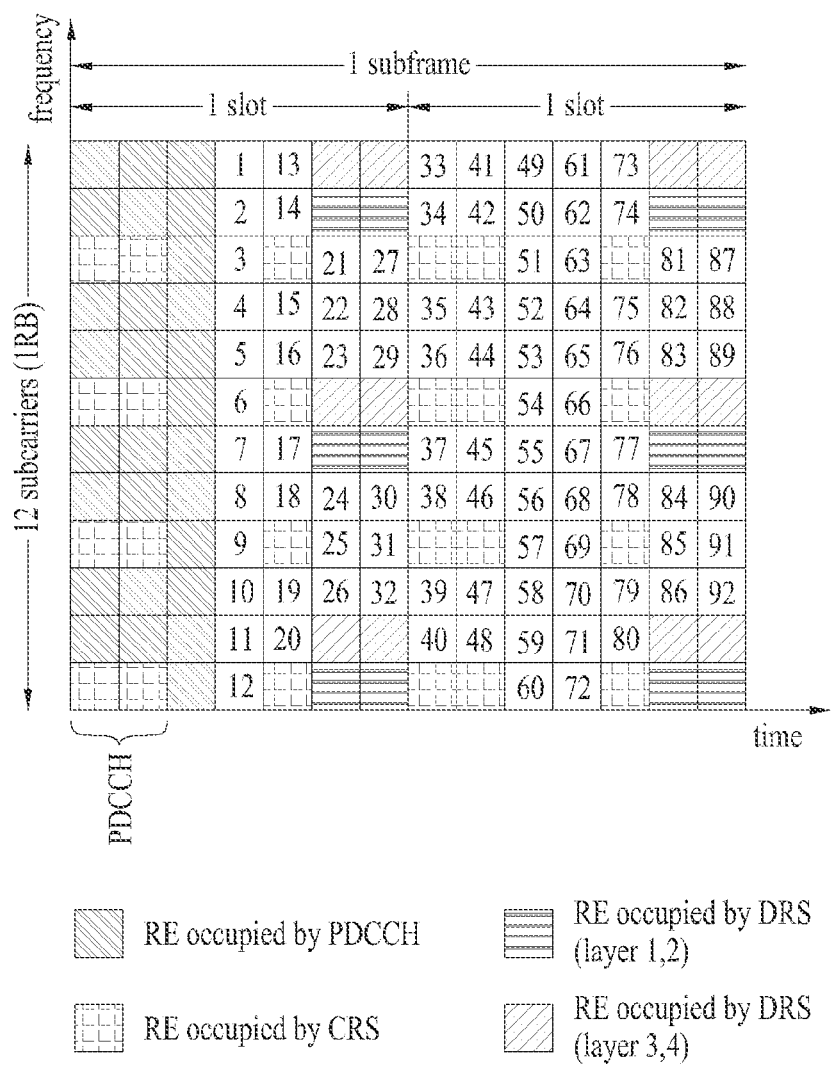
FIGS. 14 to 20 are diagrams for explaining a PDSCH mapping method according to an embodiment of the present invention.
Figure 15:
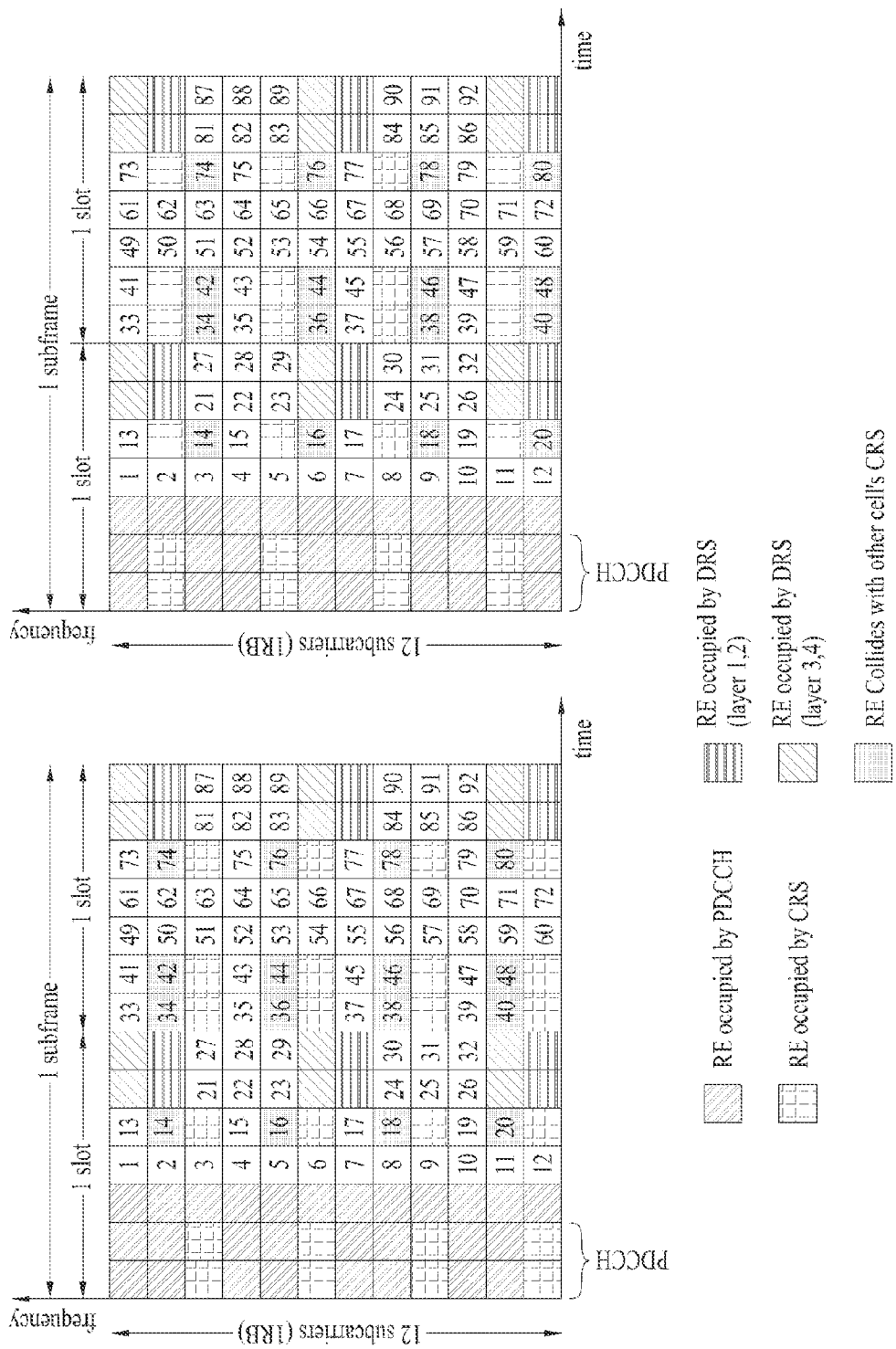

FIG. 14 illustrates PDSCH RE mapping in an RB in a normal case. FIG. 14 is premised on transmission of DMRSs on four CRS antenna ports, i.e. transmission of 4-layer DMRSs and this premise is commonly applied in the following description. Referring to FIG. 14, a PDSCH may be sequentially mapped according to REs denoted by numbers (hereinafter, these REs are referred to as available REs for a PDSCH but the available REs for the PDSCH may be different from the REs shown in FIG. 14 according to transmission of other signals such a PBCH, a PSS/SSS, a CSI-RS, etc.), except for a control region (indicated by a PCFICH) including a PDCCH and for REs corresponding to CRS positions and DMRS positions of a transmission point. In FIG. 14, a CRS position is determined by a cell ID. In more detail, the position of a start frequency in an RB is determined by a value obtained by performing cell ID mod 6. This value is called a vertical axis shift (v-shift). FIG. 15 illustrates PDSCH RE mapping of two cells/transmission points having different v-shift values.

As illustrated in FIG. 15, cell A (first transmission point) and cell B (second transmission point) having different v-shift values are included in the same CoMP cluster. Especially, when joint transmission is performed, it is generally undesirable (or when a normal UE (a first type of UE) having no CRS IC capability is considered) that PDSCHs be mapped to REs (indicated by dots of numbers 14, 16, etc. in FIG. 15) on which a cell participating in CoMP (cell B) transmits CRSs. That is, cell A and cell B that perform joint transmission may map PDSCHs as illustrated in FIG. 16.

If the PDSCH is mapped even to an RE on which a cell participating in CoMP transmits the CRS, the PDSCH may not be correctly received due to interference caused by a CRS of another cell in a corresponding position. In this case, if the UE measures interference of a neighbor cell using the CRS, a CRS position may be null and thus a large error may occur in measurement. Therefore, the cell (cell B) participating in CoMP may transmit a dummy signal to an RE in which the CRS is transmitted.

Figure 16:
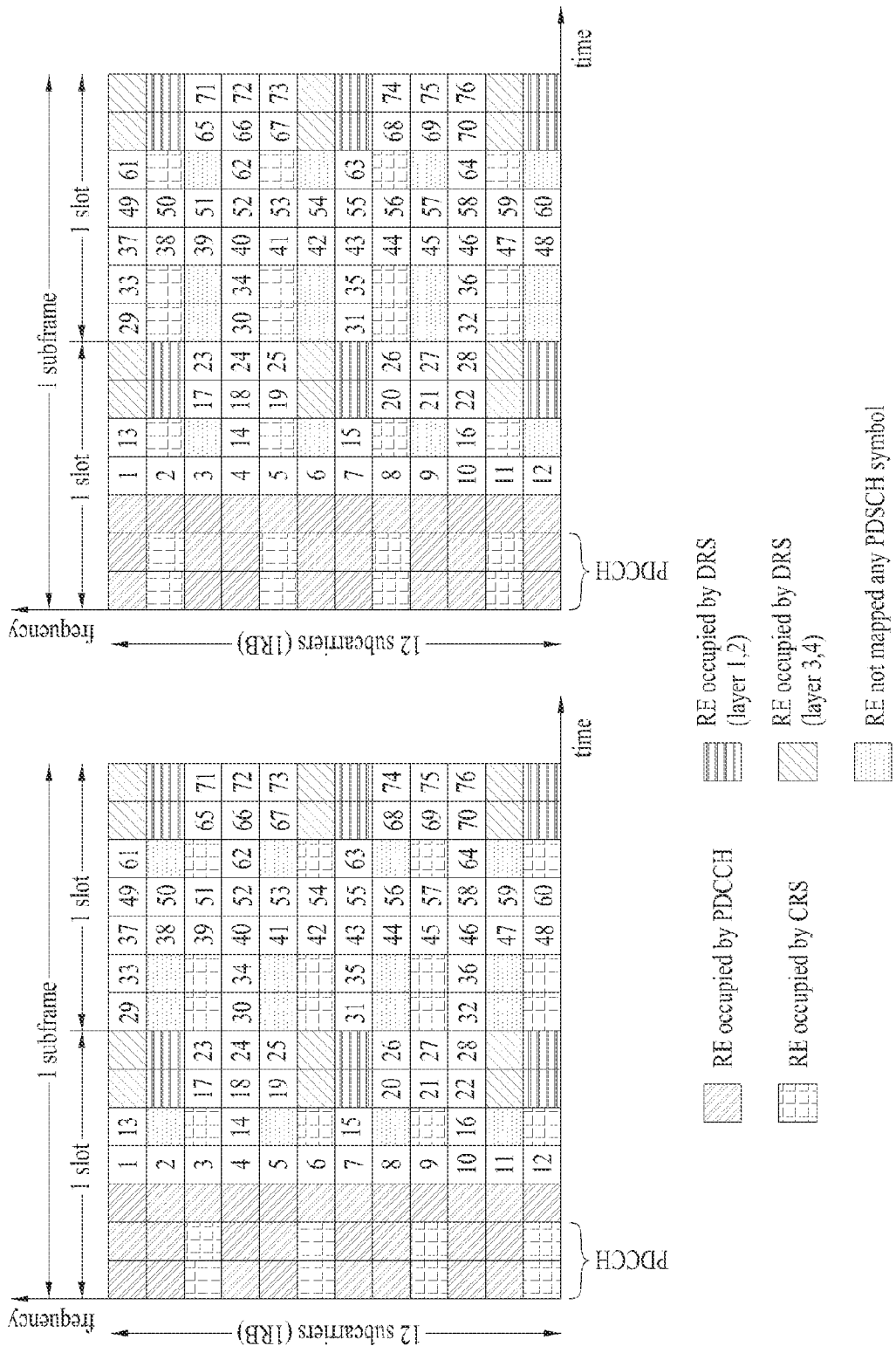
Figure 17:
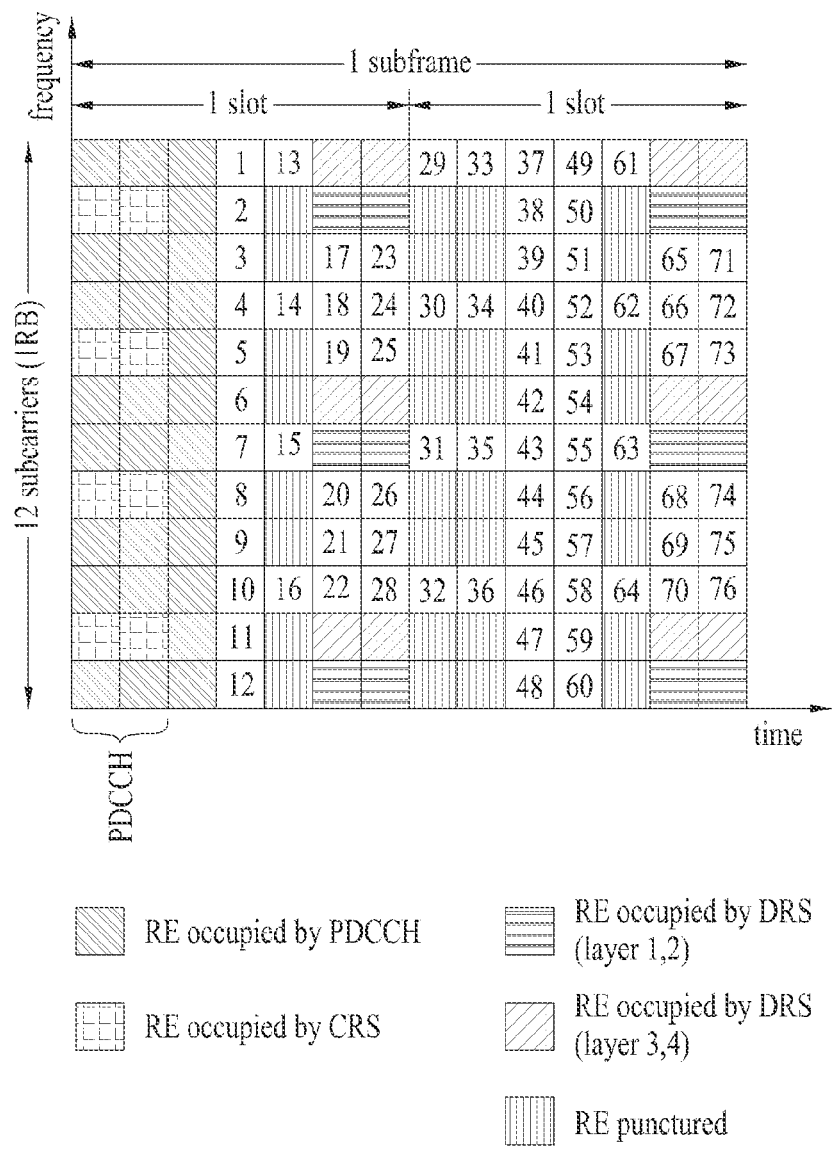

If PDSCH mapping is performed as illustrated in FIG. 16, the UE may perform decoding under the assumption that the PDSCH is mapped as illustrated in FIG. 17.

However, if the PDSCH is not mapped to a CRS position of another transmission point (second transmission point) performing joint transmission as CoMP as described above, this may waste resources when a UE (a second type of UE) having CRS IC capability (receiver) is considered, because the UE including the CRS IC receiver may correctly receive the PDSCH by cancelling the CRS of the second transmission point even when the PDSCH is mapped to the CRS position of another transmission point.

Accordingly, the first transmission point may map the PDSCH to REs of a first region except for REs (indicated as dots in FIGS. 18 and 19) corresponding to the CRS of the second transmission point among REs available for the PDSCH but, if a UE receiving the PDSCH is a second type of UE having CRS IC capability/receiver, the first transmission point may map the PDSCH to REs corresponding to the CRS of the second transmission point. Namely, for first types of UEs having no CRS IC capability/receiver, the PDSCH may be mapped to the first region and, for second types of UEs having CRS IC capability/receiver, the PDSCH may be mapped to the second region, resulting in improvement in reception performance and efficiency in resource use.

Figure 18:
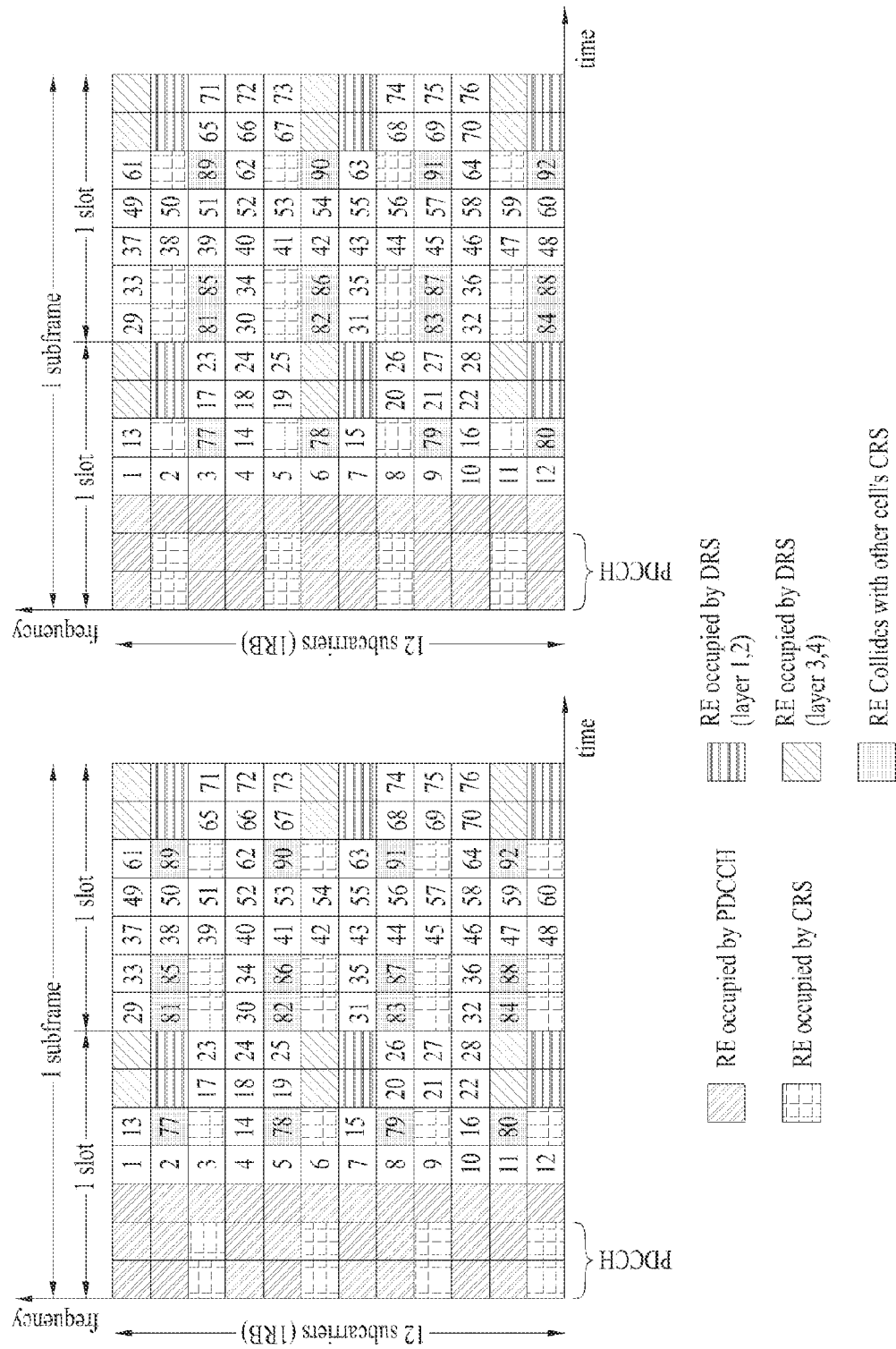
Figure 19:
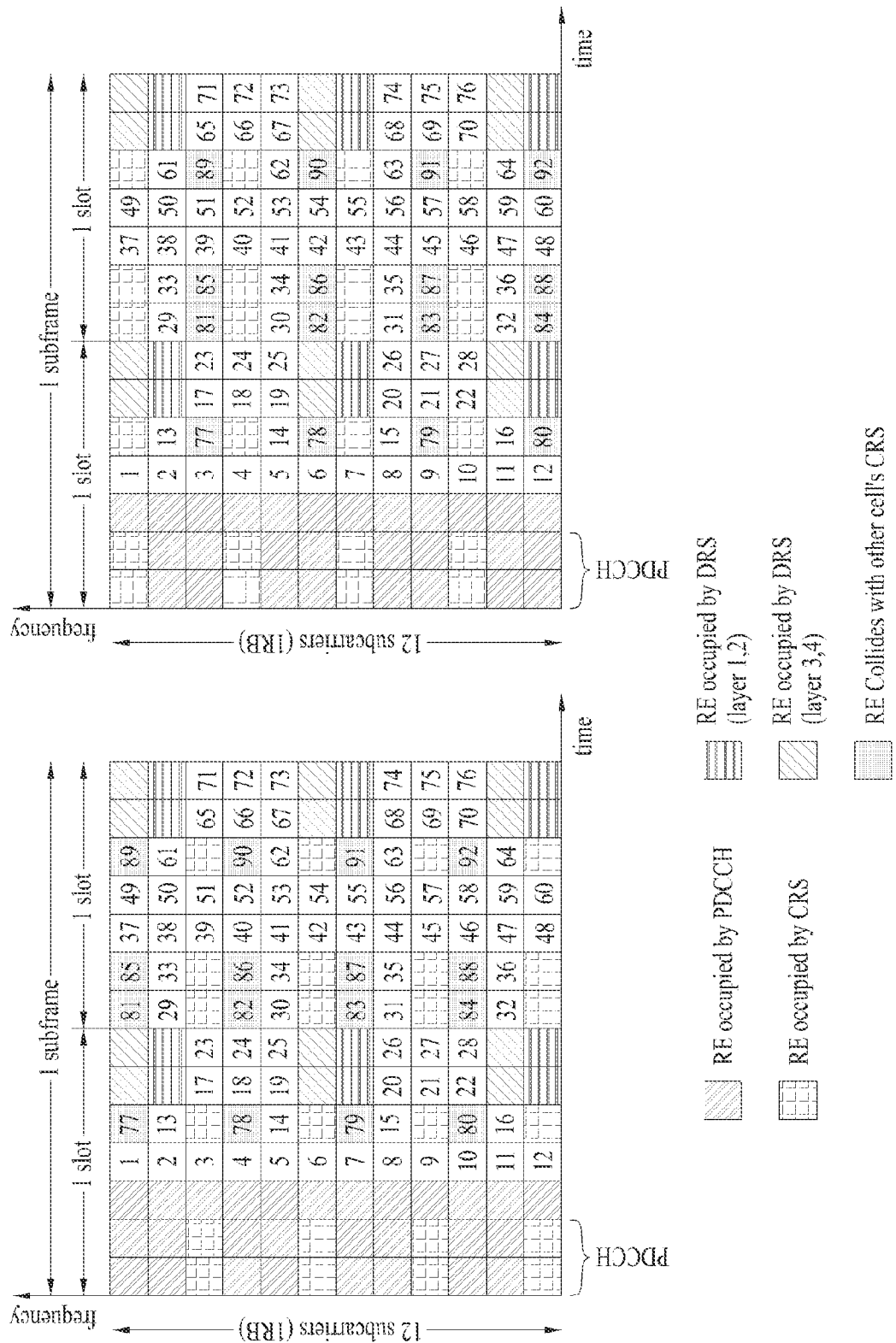

FIGS. 18 and 19 exemplarily illustrate PDSCH mapping according to the above-described embodiment. A difference in the v-shift between transmission points performing joint transmission is 1 in FIG. 18 and is 2 in FIG. 19.

For the PDSCH mapping scheme according to the above-described embodiment of the present invention, transport block segmentation/code block configuration needs to be changed. That is, in the above PDSCH mapping scheme, a code block should be configured with respect to a punctured part and an unpunctured part. If segmentation into two code blocks is performed without considering puncturing, since the first type of UE performs puncturing only on the second code block, PDSCH reception performance may be problematic.

Therefore, for the first type of UE, as a method for performing code block segmentation while uniformly maintaining code rate, a code block may be configured regardless of the number of REs on which CRS puncturing may occur and an additional code block may be configured by considering the number of REs on which CRS puncturing may occur.

For example, referring to FIG. 18, since the number of symbols (i.e. the number of REs) which can be mapped per RB is 76 when the first type of UE is considered, a code block may be configured in consideration of the number of the symbols. In addition, a code block is configured for REs capable of being punctured, i.e. 16 REs. Then, the same code rate can be maintained per code block segmented in one RB. In other words, on the premise that a transport block is segmented into a first code block and a second code block, the size of the first code block is determined in consideration of the number of REs of a first region and the size of the second code block is determined in consideration of the number of REs of a second region.

Figure 20:
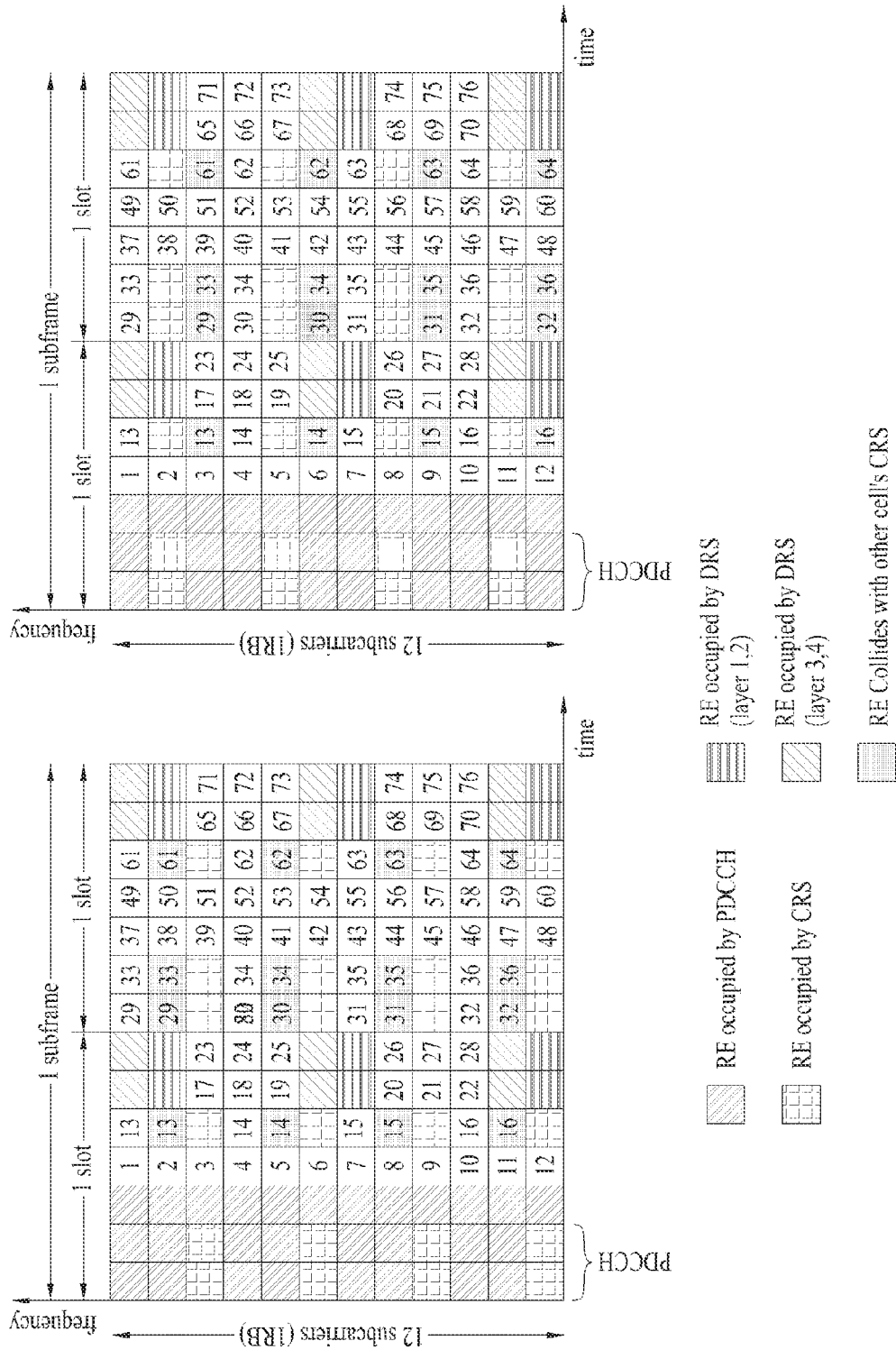

Meanwhile, the following scheme may be considered as the PDSCH mapping scheme considering the first type of UE first and also considering the second type of UE having CRS IC capability/receiver. The first transmission point maps the PDSCH to REs of the first region except for REs corresponding to the CRS of the second transmission point among REs available for the PDSCH with the proviso that the PDSCH mapped to the REs of the first region nearest to REs of the second region which correspond to the CRS of the second transmission point is mapped to REs of the second region which correspond to the CRS of the second transmission point. For example, as illustrated in FIG. 20, the first transmission point (cell A) may repeatedly map a symbol mapped to an RE of the first region adjacent to an RE (indicated by dots) corresponding to the CRS of the second transmission point (cell B) to the RE corresponding to the CRS of the second transmission point. In this case, additional energy gain can be obtained due to repeatedly used REs without affecting code rate.

CRS Handling of UE in CoMP Environment

Figure 21:
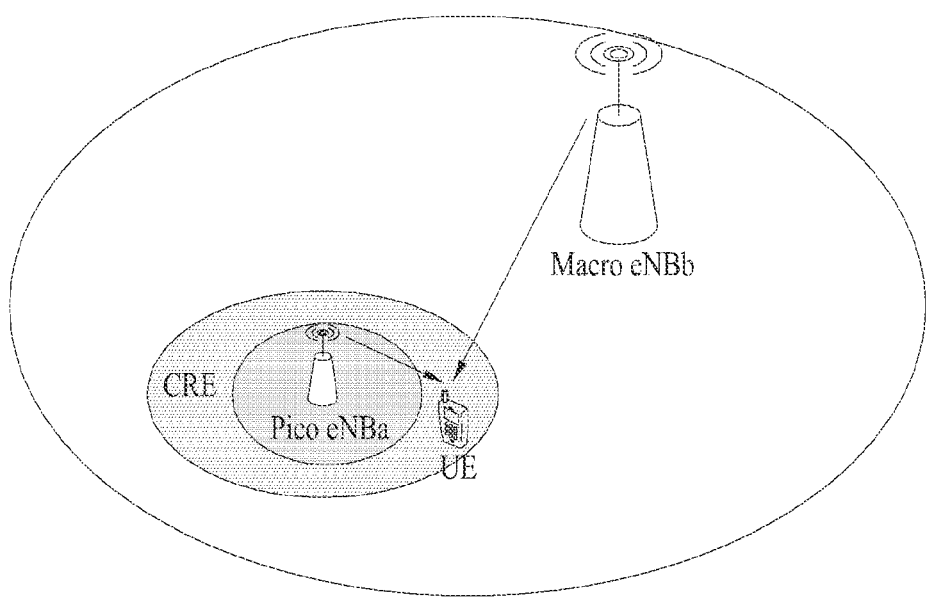
FIG. 21 is a diagram for explaining interference handling in a CoMP environment according to an embodiment of the present invention.

Hereinafter, description related to how a UE having FeICIC capability, especially, a UE having CRS IC capability should perform CRS cancellation in a CoMP environment to efficiently receive a DL signal will be given. The following description is exemplarily premised on a network environment as illustrated in FIG. 21. That is, it is assumed that the UE is located in a CRE region of a pico eNB (pico eNBa) and the pico eNB and a macro eNB perform cooperative transmission such as DPS or JT. In this situation, whether the UE should perform CRS cancellation may differ according to whether a serving cell is the pico eNB or the macro eNB or according to a combination of CoMP transmission schemes. This will be described in detail hereinbelow.

The first possible scenario is the case in which the UE has a pico eNB as a serving cell and DPS is applied to the UE as a CoMP transmission scheme. In this case, neighbor cell CRS information (NeighborCellCRSInformation) that the UE receives from the serving cell, i.e. the pico eNB, may include CRS information of one or more neighbor cells which include the macro eNB (macro eNBb) and serve as an interference source with respect to the pico eNB which is the serving cell of the UE.

First, if the UE receives a PDSCH (in a subframe) from the pico eNB, which is the serving cell of the UE, the UE need not cancel a CRS of the serving cell because the pico eNB, which is the serving cell, maps the PDSCH to REs except for REs on which a CRS thereof is transmitted. The UE needs to cancel a CRS of a neighbor cell unless the subframe is a subframe in which the macro eNB, which is a neighbor cell, performs muting for the pico eNB.

If the UE receives a PDSCH (in a subframe) from the macro eNB, which is a neighbor cell, the UE needs to perform cancellation for the CRS of the serving cell. In addition, the UE need not perform cancellation for the CRS of the neighbor cell because the macro eNB transmitting the PDSCH does not map the PDSCH to an RE on which a CRS thereof is transmitted. Even if CRS information of the macro eNB is included in CRS information of the neighbor cell, there is no need to perform CRS IC operation for the CRS of the macro eNB. However, it is necessary to signal information indicating that a CRS position of the neighbor cell has been rate-matched and information about a rate matching pattern so that the UE may not perform CRS cancellation for the CRS of the neighbor cell. Since a transmission point of DPS is dynamically selected, the rate matching pattern should also be dynamically signaled. The information indicating that rate matching has been performed and the information about the rate matching pattern should be transmitted through a control channel for DL data, preferably, through the serving cell (pico eNB). In this case, control information for the PDSCH may differ in PDSCH mapping according to a CRS frequency-domain shift (v-shift=Cell ID mod 6) of the macro eNB, the number of CRS ports, and MBSFN configuration of the macro eNB.

The second possible scenario is the case in which the UE has the macro eNB as the serving cell and DPS is applied as the CoMP transmission scheme. In this case, the neighbor cell CRS information received by the UE from the macro eNB, which is the serving cell, may include CRS information of one or more neighbor cells serving as an interference source when the pico eNB, which is the neighbor cell, transmits a PDSCH to the UE.

If the UE receives a PDSCH (in a subframe) from the macro eNB, which is the serving cell, the UE need not perform CRS cancellation/CRS interference cancellation for a CRS of the serving cell and signal the rate matching pattern, because the PDSCH transmitted to the UE is rate-matched to a CRS RE of the macro eNB. In addition, the UE need not perform CRS for of the CRS of the neighbor cell.

If the UE receives a PDSCH (in a subframe) from the pico eNB, which is the neighbor cell, the UE needs to cancel the CRS of the serving cell because the serving cell of the UE serves as a main interference source when the UE receives the PDSCH from the pico eNB. The UE does not perform cancellation for the CRS of the neighbor cell because the pico eNB, which is the neighbor cell, does not map the PDSCH to a CRS position thereof. It is necessary to signal information indicating that a CRS position of the pico eNB has been rate-matched and information about a rate matching pattern so that the UE may not perform cancellation of the CRS of the neighbor cell.

In the above description, since the CRS information of the serving cell necessary for cancellation for the CRS of the serving cell may be recognized by a cell ID in a cell detection process, the number of antenna ports, and MBSFN configuration transmitted through a system information block (SIB), additional signaling is not needed.

The above-described two cases are summarized in Table 8.

TABLE 8

| | | CRS cancellation for CRS of serving cell | CRS cancellation for CRS of neighbor cell |
|---|---|---|---|
| PDSCH transmission cell | Serving cell | Performed | Performed if serving cell is pico eNB (however, not performed in case of muting) Not performed if serving cell is macro eNB |
| | Neighbor cell | Not performed | Not performed |

The third possible scenario may be the case in which a pico eNB (pico eNBa), a first macro eNB (macro eNBb), and a second macro eNB (macro eNBc, not shown in FIG. 21) perform CoMP.

If the serving cell is the pico eNB, the UE may perform CRS IC for CRSs of neighbor eNBs received through higher layer signaling including CRSs of the first and second macro eNBs, for the purpose of signal demodulation related to the pico eNB and CSI/RRM/RLM. However, when the UE performs CSI/RRM of the first macro eNB, the UE need not perform CRS IC for CRSs of the second macro eNB and the neighbor macro eNBs.

For measurement of CSI/RRM/RLM, the eNB needs to inform the UE of whether the UE should perform CRS IC because cancellation of the CRS of the neighbor macro eNB for measurement for the pico eNB does not reflect an actual channel state if the neighbor eNBs do not protect signal transmission of the pico eNB using an ABS etc. during measurement for the pico eNB. Accordingly, it is desirable that CRS IC be performed only when restricted measurement for the pico eNB is configured. A duration during which the UE is capable of performing CRS IC for measurement may be a duration during which the macro eNBs perform ABS operation, that is, a subframe set in which the pico eNB is actually protected. If restricted measurement is not configured for RRM/RLM measurement, CRS IC operation may not be performed.

However, if restricted measurement is configured, the UE may not perform CRS IC for CSI/RRM/RLM measurement of all eNBs. For example, it is not desirable to cancel the CRS of the second macro eNB for CSI/RRM/RLM measurement of the first macro eNB because ABSs of the first and second macro eNBs serve to protect not a signal of other macro eNBs but a signal of the pico eNB. Therefore, even when restricted measurement is configured, since whether to perform CRS IC may differ according to an eNB for which CSI/RRM/RLM measurement is to be performed in a specific measurement subframe subset, it is necessary for the eNB to indicate whether CRS IC should be performed. In other words, the eNB may signal whether CRS IC should be performed with respect to a specific transmission point/eNB for CSI/RRM/RLM measurement.

Quasi Co-Location/Located (QCL)

Hereinafter, an embodiment of the present invention related to QCL in the above-described 'PDSCH RE mapping and quasi co-location indicator' field will be described. The 'PDSCH RE mapping and Quasi co-location indicator' field is included in DCI format 2D and is composed of 2 bits. Information included in each state of the field is shown in Table 9.

TABLE 9

| Value of 'PDSCH RE Mapping and Quasi-Co-Location Indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

In Table 9, parameter sets are transmitted to the UE through higher layer signaling and may include information shown in Table 10.

TABLE 10

'Number of CRS antenna ports for PDSCH RE mapping'.
'CRS frequency shift for PDSCH RE mapping'.
'MBSFN subframe configuration for PDSCH RE mapping'.
'Zero-power CSI-RS resource configuration for PDSCH RE mapping'.
'PDSCH starting position for PDSCH RE mapping'.
'CSI-RS resource configuration identity for QC assumption.

In Table 10, 'Number of CRS antenna ports for PDSCH RE mapping', 'CRS frequency shift for PDSCH RE mapping', 'MBSFN subframe configuration for PDSCH RE mapping', 'Zero-power CSI-RS resource configuration for PDSCH RE mapping', and 'PDSCH starting position for PDSCH RE mapping' correspond to information for indicating PDSCH RE mapping. 'CSI-RS resource configuration identity for QC assumption' includes CRS information for QC assumption of the UE and indicates which cell's CRS related 'large-scale property' the UE can use.

In more detail, information shown in Table 10 may be transmitted to the UE as 'PDSCH-RE-MappingQCL-Config IE' shown in Table 11.

TABLE 11

| PDSCH-RE-MappingQCL-Config-r11 ::= | SEQUENCE { |
|---|---|
| pdsch-RE-MappingQCL-ConfigId-r11 PDSCH-RE-MappingQCL-ConfigId-r11, | |
| optionalSetOfFields-r11 | SEQUENCE { |
| crs-PortsCount-r11 | ENUMERATED {n1, n2, n4, spare1}, |
| crs-FreqShift-r11 | INTEGER (0..5), |
| mbsfn-SubframeConfig-r11 OPTIONAL,  -- Need OR | MBSFN-SubframeConfig |
| pdsch-Start-r11 n1, n2, n3, n4, assigned} } | ENUMERATED {reserved, |

TABLE 11-continued

| | |
|---|---|
| | OPTIONAL, -- Need OP |
| csi-RS-IdentityZP-r11 | CSI-RS-IdentityZP-r11, |
| qcl-CSI-RS-IdentityNZP-r11 | CSI-RS-IdentityNZP-r11 |
| OPTIONAL, -- Need OR | |
| ... | |
| } | |

In the above Table 10, 'qcl-CSI-RS-IdentityNZP-r11' corresponds to 'CSI-RS-ConfigNZP-r11' shown in Table 11 and includes QCL CRS information (qcl-CRS-Info-r11) capable of supporting QC assumption. The QCL CRS information includes cell ID related information (qcl-ScramblingIdentity), number-of-CRS-ports information (crs-PortsCount), and MBSFN subframe configuration information (mbsfn-SubframeConfig).

TABLE 11

| | |
|---|---|
| CSI-RS-ConfigNZP-r11 ::= | SEQUENCE { |
| csi-RS-IdentityNZP-r11 | CSI-RS-IdentityNZP-r11, |
| antennaPortsCount-r11 | ENUMERATED {an1, an2, an4, an8}, |
| resourceConfig-r11 | INTEGER (0..31), |
| subframeConfig-r11 | INTEGER (0..154), |
| scramblingIdentity-r11 | INTEGER (0..503), |
| qcl-CRS-Info-r11 | SEQUENCE { |
| qcl-ScramblingIdentity-r11 | INTEGER (0..503}, |
| crs-PortsCount-r11 | ENUMERATED {n1, n2, n4, spare1}, |
| mbsfn-SubframeConfig-r11 | MBSFN-SubframeConfig |
| OPTIONAL, -- Need OR | |
| } | |
| | OPTIONAL, -- Need OR |
| ... | |
| } | |

The UE may be aware of information about an RE, a subframe, a transmission cycle, etc. for CSI-RS transmission through the CSI-RS configuration information as shown in Table 11 and may receive a CSI-RS. In addition, the UE may be aware of a cell in which a CSI-RS is to be received using QC assumption with a CRS of the cell, through QCL CRS information of the CSI-RS configuration information. The QCL CRS information includes, as described above, the number-of-CRS-port information (crs-PortsCount) and the MBSFN subframe configuration information (mbsfn-SubframeConfig). The QCL CRS information may not equal information known to the UE. For example, when cell ID related information (qcl-ScramblingIdentity) in the QCL CRS information is identical to that of a serving cell of the UE, the UE is aware of CRS port information obtained through serving cell search and MBSFN configuration information obtained through SIB 2. If the CRS port information and the MBSFN configuration information are different from the number-of-CRS-ports information (crs-PortsCount) and MBSFN subframe configuration information (mbsfn-SubframeConfig) in the QCL CRS information, respectively, operation of the UE may be problematic. Then, the information known to the UE may be given priority. This will be described in more detail hereinbelow.

First, the number-of-CRS-ports information (crs-PortsCount) recognized by the UE in the QCL CRS information may be different from the number of CRS ports known to the UE. Specifically, if the number-of-CRS-ports information (crs-PortsCount) recognized in the CRS information is greater than the number of CRS ports known to the UE, QCL assumption may be applied only to the number of CRS ports known to the UE. If the number-of-CRS-ports information (crs-PortsCount) recognized in the CRS information is less than the number of CRS ports known to the UE, QCL assumption may be applied only to CRS ports corresponding to the number-of-CRS-ports information in the CRS information.

Second, in relation to the MBSFN subframe configuration information (mbsfn-SubframeConfig), if MBSFN subframe configuration (mbsfn-SubframeConfig) in the QCL CRS information is different from MBSFN subframe configuration received through an SIB, MBSFN subframe configuration received through the SIB has priority. Specifically, if a subframe in which a CSI-RS is received is an MBSFN subframe according to the MBSFN subframe configuration information in the QCL CRS information and is a normal subframe according to information known to the UE, all CRSs of a subframe may be used for QCL assumption. In addition, if the subframe in which the CSI-RS is received is a normal subframe according to the MBSFN subframe configuration information in the QCL CRS information and is an MBSFN subframe according to the information known to the UE, CRSs up to the second OFDM symbol in a subframe, i.e. CRSs of a control region (PDSCH region) may be used for QCL assumption.

If the subframe in which the CSI-RS is received is included in a broadcast control channel (BCCH) modification period (MP), i.e. there is update of system information, the MBSFN subframe configuration information (mbsfn-SubframeConfig) in the QCL CRS information may be given priority. In this case, RRC reconfiguration needs to be properly performed so that the CSI-RS configuration information may be updated at a modification time of the system information. To accurately match a time at which change of the system information is to be applied, UE-dedicated RRC signaling of CSI-RS configuration may be indicated together with information about a timing at which corresponding information (e.g. QCLed CRS information including a CRS scrambling ID, number of CRS ports, and/or MBSFN subframe configuration) is to be applied (e.g. specific time information may be included such that the eNB and the UE can be aware of an accurate absolute time along with a slot number ($n_s$) unit, a subframe unit, an SFN, and a radio frame number).

If 'CSI-RS-ConfigNZP-r11' is given as shown in Table 12, i.e. if number-of-CRS-ports information (crs-PortsCount) and MBSFN subframe configuration information (mbsfn-SubframeConfig) are omitted because a PCID of a serving cell has the same value as 'qcl-ScramblingIdentity', the number of CRS ports and/or MBSFN configuration may be predefined to conform to information of the serving cell. This may be limitedly applied only to the case in which the UE is configured as QCL type B.

TABLE 11

| | |
|---|---|
| CSI-RS-ConfigNZP-r11 ::= | SEQUENCE { |
| csi-RS-IdentityNZP-r11 | CSI-RS-IdentityNZP-r11, |
| antennaPortsCount-r11 | ENUMERATED {an1, an2, an4, an8}, |
| resourceConfig-r11 | INTEGER (0..31), |
| subframeConfig-r11 | INTEGER (0..154), |
| scramblingIdentity-r11 | INTEGER (0..503), |
| qcl-CRS-Info-r11 | SEQUENCE { |
| qcl-ScramblingIdentity-r11 | INTEGER (0..503}, |
| OPTIONAL, -- Need OR | |
| } | |
| | OPTIONAL, -- Need OR |
| ... | |
| } | |

The above description is not necessarily applied to the case in which 'qcl-ScramblingIdentity' is always equal to the PCID of the serving cell. For example, the number of CRS ports of the serving cell and MBSFN information known through SIB2 may be always configured as default information and the default information may be applied to information which is not transmitted through RRC signaling out of the number of CRS ports and the MBSFN information. That is, although 'qcl-ScramblingIdentity' in the QCL CRS information of specific CSI-RS configuration is different from the PCID of the serving cell, if all or a part of the number-of-CRS-ports information (crs-PortsCount) and the MBSFN subframe configuration information (mbsfn-SubframeConfig) is omitted, the default information may always be used for the omitted information.

Neighbor cell CRS information is transmitted to the UE for CRS handling. In addition, for QC assumption of the UE, a cell ID, the number of CRS ports, and MBSFN subframe configuration of a cell which can support QC assumption are signaled. For PDSCH RE mapping, similar information is also transmitted. A container to which corresponding information is transmitted also differs. The neighbor cell CRS information transmitted for the purpose of CRS interference handling is transmitted in NeighborCellCRSInformation IE and CRS information transmitted for QC assumption is transmitted in qcl-CRS-Info IE in CSI-RS-ConfigNZP. If CRS information of a specific cell, especially, if MBSFN subframe configuration is updated in one of the three IEs and then transmitted to the UE, the UE should use the most recently updated value upon using the CRS information of the cell.

For example, if CRS information of cell A is transmitted to NeighborCellCRSInformation IE and is also transmitted to qcl-CRS-Info IE, the UE may receive NeighborCellCRSInformation IE first to perform interference handling for a CRS of cell A. In this case, if the UE is changed to transmission mode 10 or a CoMP measurement set is changed and thus there is a need to use QC assumption for cell A, the UE may receive qcl-CRS-Info. If the CRS information of cell A is included in the IE and CRS information of cell A included in two IEs is different, the UE may rely on the most recently received CRS information of cell A and updates the CRS information of cell A included in existing NeighborCellCRSInformation IE without any signaling to the most recently received value to perform CRS IC operation from cell A. Similarly, even when the UE has already received IEs, the UE relies on the most recently received or updated value.

Figure 22:
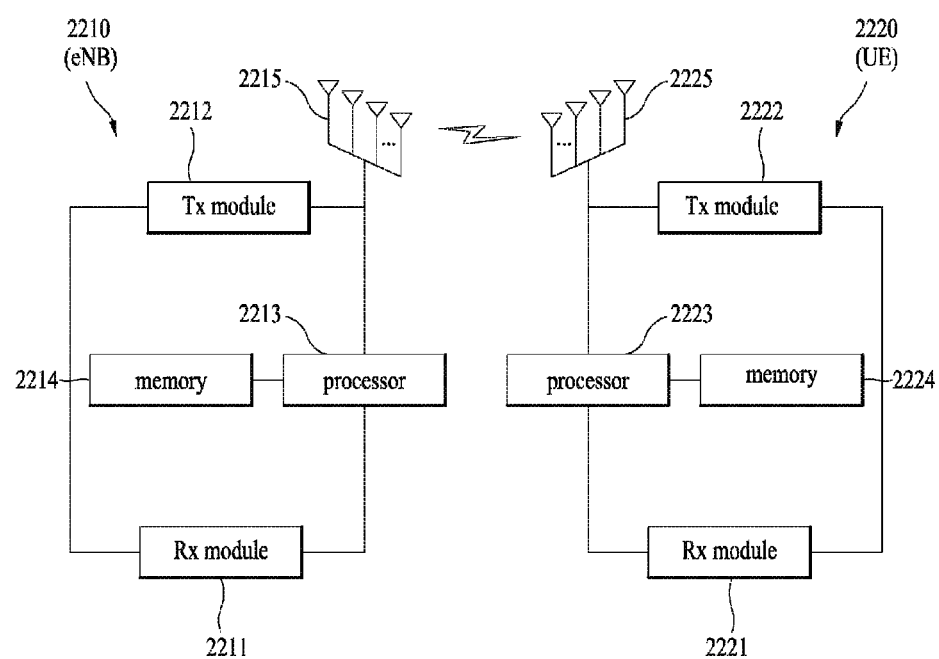
FIG. 22 is a diagram illustrating a transmitter and a receiver.

FIG. 22 is a diagram illustrating a transmission point apparatus and a UE apparatus according to an embodiment of the present invention.

Referring to FIG. 22, a transmission point apparatus 2210 according to the present invention may include a reception (Rx) module 2211, a transmission (Tx) module 2212, a processor 2213, a memory 2214, and a plurality of antennas 2215. The plurality of antennas 2215 indicates a transmission point apparatus for supporting MIMO transmission and reception. The Rx module 2211 may receive a variety of signals, data, and information on UL from the UE. The Tx module 2212 may transmit a variety of signals, data, and information on DL to the UE. The processor 2213 may control overall operation of the transmission point apparatus 2210.

The processor 2213 of the transmission point apparatus 2210 according to one embodiment of the present invention may operate to perform the above-mentioned embodiments.

The processor 2213 of the transmission point apparatus 2210 processes information received at the transmission point apparatus 2210 and transmission information to be externally transmitted. The memory 2214 may store the processed information for a predetermined time. The memory 2214 may be replaced with a component such as a buffer (not shown).

Referring to FIG. 22, a UE apparatus 2220 may include an Rx module 2221, a Tx module 2222, a processor 2223, a memory 2224, and a plurality of antennas 2225. The plurality of antennas 2225 indicates a UE apparatus supporting MIMO transmission and reception. The Rx module 2221 may receive downlink signals, data, and information from the eNB. The Tx module 2222 may transmit UL signals, data, and information to the eNB. The processor 2223 may control overall operation of the UE apparatus 2220.

The processor 2223 of the UE apparatus 2220 according to one embodiment of the present invention can operate to perform the above-mentioned embodiments.

The processor 2223 of the UE apparatus 2220 processes information received at the UE apparatus 2220 and transmission information to be externally transmitted. The memory 2224 may store the processed information for a predetermined time. The memory 2224 may be replaced with a component such as a buffer (not shown).

The specific configurations of the transmission point apparatus and the UE apparatus may be implemented such that the various embodiments of the present invention are independently performed or two or more embodiments of the present invention are simultaneously performed. Redundant matters will not be described herein for clarity.

The description of the transmission point apparatus 2210 shown in FIG. 22 may be identically applied to a relay node acting as a DL transmission entity or UL reception entity and the description of the UE apparatus 2220 may be identically applied to the relay node acting as a DL reception entity or a UL transmission entity.

The above-described embodiments may be implemented by various means, for example, by hardware, firmware, software, or a combination thereof.

In a hardware configuration, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to be limited to the embodiments disclosed herein but is to give a broadest range matching the principles and new features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. The present invention is not intended to limit the embodiments disclosed herein but is to give a broadest range matching the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for receiving a downlink signal by a user equipment (UE) in a wireless communication system, the method comprising:
receiving, via a radio resource control (RRC) signaling, a channel state information-reference signal (CSI-RS) according to CSI-RS configuration information including quasi co-location (QCL) cell-specific reference signal (CRS) information,
wherein the UE receives the CSI-RS using a QCL assumption based on the QCL CRS information, and
if information included in the QCL CRS information is not equal to system information Which corresponds to the information included in the QCL CRS information and is known to, and acquired by, the UE through a system information block, the system information known to the UE is given priority and applied.

2. The method according to claim 1, wherein the information included in the QCL CRS information includes cell identifier (ID) related information, information about a number of CRS ports, and multimedia broadcast single frequency network (MBSFN) subframe configuration information.

3. The method according to claim 2, wherein, if the number of CRS ports is greater than a number of CRS ports known to the UE by the system information, the QCL assumption is applied only to the number of CRS ports known to the UE.

4. The method according to claim 2, wherein if the number of CRS ports is less than a number of CRS ports known to the UE by the system information, the QCL assumption is applied to CRS ports corresponding to the information about the number of CRS ports.

5. The method according to claim 2, wherein, if a subframe in which the CSI-RS is received is an MBSFN subframe according to the MBSFN subframe configuration information and is a normal subframe according to the system information known to the UE, all CRSs of the subframe in which the CSI-RS is received are used for the QCL assumption.

6. The method according to claim 2, wherein, if a subframe in which the CSI-RS is received is a normal subframe according to the MBSFN subframe configuration information and is an MBSFN subframe according to the system information known to the UE, CRSs up to the second OFDM symbol in the subframe in which the CSI-RS is received are used for the QCL assumption.

7. The method according to claim 2, wherein the cell ID related information is equal to serving cell ID related information of the UE.

8. The method according to claim 7, wherein system information which corresponds to the information about the number of CRS ports and is known to the UE is acquired when the UE performs initial access to a serving cell.

9. The method according to claim 2, wherein system information which corresponds to the MBSFN configuration information and is known to the UE is acquired by the UE through the system information block.

10. The method according to claim 1, wherein a subframe in which the CSI-RS is received is not included in a broadcast control channel (BCCH) modification period.

11. The method according to claim 10, wherein, if the subframe in which the CSI-RS is received is included in the BCCH modification period, information included in the QCL CRS information is given priority over the system information known to the UE and applied.

12. The method according to claim 1, wherein the CSI-RS configuration information is transmitted to the UE through higher layer signaling.

13. A user equipment (UE) in a wireless communication system, the UE comprising:
a reception module; and
a processor connected with the reception module,
wherein the processor is configured to control the reception module to receive, via a radio resource control (RRC) signaling, a channel state information-reference signal (CSI-RS) according to CSI-RS configuration information including quasi co-location (QCL) cell-specific reference signal (CRS) information, and
wherein the UE receives the CSI-RS using a QCL assumption based on the QCL CRS information, and
if information included in the QCL CRS information is not equal to system information which corresponds to the information included in the QCL CRS information and is known to, and acquired by, the UE through a system information block, the system information known to the UE is given priority and applied.

* * * * *